United States Patent
Georgy et al.

(10) Patent No.: US 10,184,797 B2
(45) Date of Patent: Jan. 22, 2019

(54) APPARATUS AND METHODS FOR ULTRASONIC SENSOR NAVIGATION

(71) Applicant: Invensense, Inc., San Jose, CA (US)

(72) Inventors: Jacques Georgy, Calgary (CA); Amr Al-Hamad, Calgary (CA); Christopher Goodall, Calgary (CA)

(73) Assignee: InvenSense, Inc., San Jose, CA (US)

( * ) Notice: Subject to any disclaimer, the term of this patent is extended or adjusted under 35 U.S.C. 154(b) by 0 days.

(21) Appl. No.: 15/005,635

(22) Filed: Jan. 25, 2016

(65) Prior Publication Data

US 2017/0176188 A1  Jun. 22, 2017

Related U.S. Application Data

(60) Provisional application No. 62/269,837, filed on Dec. 18, 2015.

(51) Int. Cl.

| | |
|---|---|
| *G01C 21/00* | (2006.01) |
| *H04W 72/04* | (2009.01) |
| *H04W 72/02* | (2009.01) |
| *G01S 15/60* | (2006.01) |
| *G01S 19/48* | (2010.01) |
| *G01C 21/16* | (2006.01) |
| *G01C 21/20* | (2006.01) |
| *H04W 4/02* | (2018.01) |

(52) U.S. Cl.
CPC ......... *G01C 21/005* (2013.01); *G01C 21/165* (2013.01); *G01C 21/20* (2013.01); *G01S 15/60* (2013.01); *G01S 19/48* (2013.01); *H04W 4/027* (2013.01); *H04W 72/042* (2013.01); *H04W 72/0413* (2013.01)

(58) Field of Classification Search
CPC .... G01C 21/005; G01C 21/20; G01C 21/165; G01S 15/08; G01S 15/93; H04W 4/027
See application file for complete search history.

(56) References Cited

U.S. PATENT DOCUMENTS

| | | | | |
|---|---|---|---|---|
| 6,094,164 A | * | 7/2000 | Murphy | G01S 5/0036 342/357.31 |
| 6,816,437 B1 | * | 11/2004 | Teller | G01S 5/186 367/124 |

(Continued)

OTHER PUBLICATIONS

EIC 3600 Search Report, dated Jun. 20, 2017.*

*Primary Examiner* — Jeffrey C Boomer
(74) *Attorney, Agent, or Firm* — Bay Area Technology Law Group PC

(57) ABSTRACT

An apparatus and methods are disclosed for determining a navigational constraint for a portable device using an ultrasonic sensor. The navigational constraint may be used to supplement other navigational solutions or may be used independently. The ultrasonic sensor may provide a plurality of samples to be processed to determine the constraint. Processing the ultrasonic samples may include performing a flow analysis regarding detected external objects. Determining the constraint may include any or all of determining a context for usage, distinguishing usage modes, estimating relative heading changes, and estimating misalignment angle between device and platform needed to determine direction of motion of the platform and determining a speed of the portable device from the samples.

46 Claims, 7 Drawing Sheets

(56) References Cited

U.S. PATENT DOCUMENTS

| | | | | |
|---|---|---|---|---|
| 8,686,326 B1* | 4/2014 | Dennison | G06T 7/269 | 244/3.1 |
| 8,762,055 B2* | 6/2014 | Nash | G01C 21/12 | 701/500 |
| 8,903,430 B2* | 12/2014 | Sands | G01S 13/876 | 348/14.02 |
| 9,145,067 B1* | 9/2015 | Dahlen | B60L 15/10 | |
| 9,398,210 B2* | 7/2016 | Stach | G06T 1/0021 | |
| 9,562,788 B1* | 2/2017 | Jinkins | G01S 13/60 | |
| 2010/0042319 A1* | 2/2010 | Wu | G05D 1/0246 | 701/408 |
| 2011/0096954 A1* | 4/2011 | Dahl | G06F 3/017 | 382/103 |
| 2011/0103448 A1* | 5/2011 | Dahl | G01S 7/5273 | 375/224 |
| 2011/0149094 A1* | 6/2011 | Chen | H04N 5/23248 | 348/208.3 |
| 2012/0053826 A1* | 3/2012 | Slamka | G01S 19/14 | 701/301 |
| 2012/0221244 A1* | 8/2012 | Georgy | G01C 21/165 | 701/472 |
| 2012/0254100 A1* | 10/2012 | Grokop | A61B 5/1123 | 706/52 |
| 2013/0176258 A1* | 7/2013 | Dahl | G01S 7/5273 | 345/173 |
| 2013/0336093 A1* | 12/2013 | Suvanto | G01S 15/06 | 367/99 |
| 2014/0121961 A1* | 5/2014 | Calvarese | G01S 11/14 | 701/495 |
| 2014/0226864 A1* | 8/2014 | Venkatraman | G01C 21/20 | 382/107 |
| 2014/0253284 A1* | 9/2014 | Peterson | H04B 1/3888 | 340/3.1 |
| 2014/0297212 A1* | 10/2014 | Anderson | G01C 25/005 | 702/90 |
| 2015/0253424 A1* | 9/2015 | Cheatham, III | G01S 15/89 | 367/107 |
| 2015/0292879 A1* | 10/2015 | Zhou | G01S 7/529 | 73/631 |
| 2015/0316579 A1* | 11/2015 | Pakzad | G01P 15/02 | 702/150 |
| 2015/0345952 A1* | 12/2015 | Chang | G01C 22/002 | 701/541 |
| 2015/0354951 A1* | 12/2015 | Ali | G01C 21/16 | 702/141 |
| 2016/0044394 A1* | 2/2016 | Derom | H04R 1/00 | 367/95 |
| 2016/0224855 A1* | 8/2016 | Al-Hamad | G01C 11/04 | |
| 2016/0231415 A1* | 8/2016 | Liao | G01C 21/165 | |
| 2016/0363448 A1* | 12/2016 | Tornqvist | G01C 17/38 | |
| 2016/0364960 A1* | 12/2016 | Cheatham, III | G01S 15/46 | |
| 2017/0004630 A1* | 1/2017 | Al-Hamad | G01C 21/206 | |
| 2017/0013116 A1* | 1/2017 | Zhang | G08B 21/02 | |
| 2017/0026800 A1* | 1/2017 | Kim | H04W 4/026 | |
| 2017/0030716 A1* | 2/2017 | Ali | G06K 9/00355 | |
| 2017/0052249 A1* | 2/2017 | Bartsch | G01S 15/931 | |
| 2017/0115743 A1* | 4/2017 | Kasar | G06F 3/017 | |

* cited by examiner

APPARATUS AND METHODS FOR ULTRASONIC SENSOR NAVIGATION

FIELD OF THE PRESENT DISCLOSURE

This disclosure generally relates to navigation techniques employing a portable device and more specifically to navigational constraints determined using an ultrasonic sensor

BACKGROUND

Portable electronic devices, such as those configured to be handheld or otherwise associated with a user, are employed in a wide variety of applications and environments The ubiquity of such devices as mobile phones, digital still cameras and video cameras, handheld music and media players, portable video game devices and controllers, mobile internet devices (MIDs), personal navigation devices (PNDs), and other similar devices speaks the popularity and desire for these types of devices. Increasingly, such devices are equipped with one or more sensors or other systems for determining the position of motion of the portable device. Exemplary applications for such capabilities are to provide the user with navigational assistance and to enable location awareness so that the device may provide data relevant to the geographical position of the user or otherwise customize operation of the device. It may also be desirable to determine navigation information for other devices that are capable of motion, such as autonomous or piloted vehicles.

Common techniques for achieving these goals include reference-based systems that utilize external sources of information to make absolute determinations Examples include satellite-based navigation, such as a Global Navigation Satellite System (GNSS), and signal trilateration using wireless local area networks (WLANs) or cellular telecommunication systems. Other navigational techniques include self-contained strategies, such as dead reckoning determinations based upon the integration of specific forces and angular rates measured by inertial sensors (e.g. accelerometer, gyroscopes) integrated into the device.

As will be appreciated, despite the utility of such techniques, usage conditions may result in less than optimal performance. Satellite navigation relies on a clear line of sight which may not always be available while wireless signal trilateration does not always achieve a desired degree of precision and may require infrastructure that may not be present. Likewise, self-contained solutions may also be deficient at times For example, inertial navigation determinations may be complicated when the portable device is employed in varying orientations. Further, the inertial sensors typically used in portable devices are subject to errors that may cause a dead reckoning navigational solution to degrade relative rapidly.

Given that existing positional and navigational techniques may suffer from these and other drawbacks, it would be desirable to provide an additional source of information that may be used in determine a positional and/or navigational solution. For example, it would be desirable to provide an independent positional and/or navigational solution when other techniques are unavailable or are compromised. It would also be desirable to augment an existing technique to improve performance, such as by determining a constraint that may be applied to the existing technique. Still further, it would be desirable to use an ultrasonic sensor in portable devices, alone or in conjunction with other equipment such as a camera that may commonly be provided with such portable devices. Accordingly, this disclosure satisfies these and other goals as described in the following materials.

SUMMARY

As will be described in detail below, this disclosure includes a method for navigating with a device. The method may involve processing a sequence of samples from an ultrasonic sensor of the device, determining a navigational constraint for the device based at least in part on the processed samples and providing a navigation solution for the device based at least in part on the determined navigational constraint This disclosure also includes a device having an ultrasonic sensor and an ultrasonic navigation module, such that the ultrasonic navigation module may process a sequence of samples from the ultrasonic sensor of the device, determine a navigational constraint for the device based at least in part on the processed samples and provide a navigation solution for the device based at least in part on the determined navigational

DETAILED DESCRIPTION

Figure 1:
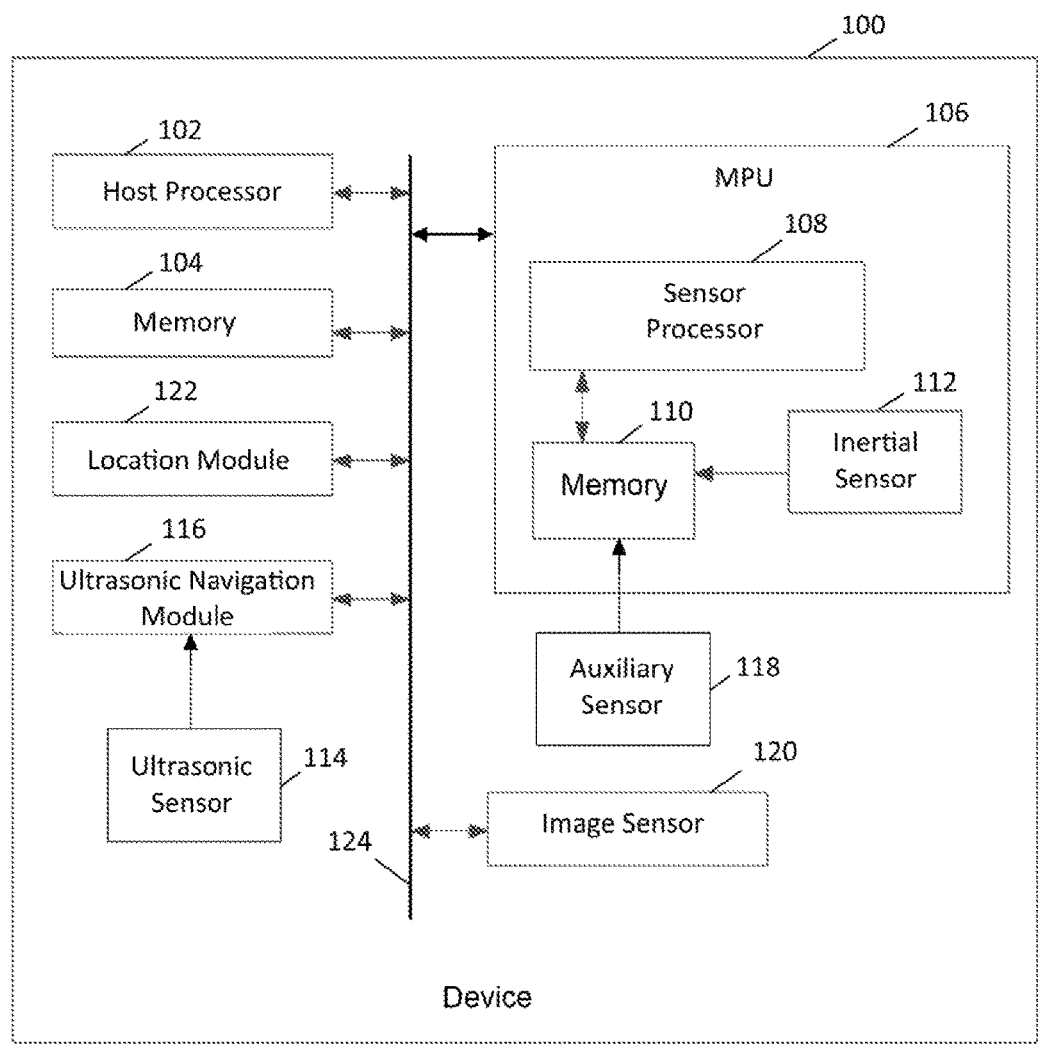
FIG. 1 is schematic diagram of a device for navigation using an ultrasonic sensor according to an embodiment

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein It is also to be under stood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art In the present application, a procedure, logic block, process, or the like, is conceived to be a self-consistent sequence of steps or instructions leading to a desired result The steps are those requiring physical manipulations of physical quantities Usually, although not necessarily, these quantities take the form of electrical or magnetic signals capable of being stored, transferred, combined, compared, and otherwise manipulated in a computer system It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of non-transitory processor-readable medium, such as program modules, executed by one or more computers or other devices Generally, program modules include routines, programs, objects, components, data structures, etc, that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the over all system. Skilled artisans may implement the described functionality in varying ways for each particular application, but such implementation decisions should not be interpreted as causing a departure from the scope of the present disclosure. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor. For example, a carrier wave may be employed to carry computer-readable electronic data such as those used in transmitting and receiving electronic mail or in accessing a network such as the Internet or a local area network (LAN). Of course, many modifications may be made to this configuration without departing from the scope or spirit of the claimed subject matter.

The various illustrative logical blocks, modules, circuits and instructions described in connection with the embodiments disclosed herein may be executed by one or more processors, such as one or more motion processing units (MPUs), digital signal processors (DSPs), general purpose microprocessors, application specific integrated circuits (ASICs), application specific instruction set processors (ASIPs), field programmable gate arrays (FPGAs), or other equivalent integrated or discrete logic circuitry The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an MPU and a microprocessor, a plurality of microprocessors, one or more microprocessors in conjunction with an MPU core, or any other such configuration.

Unless defined otherwise, all technical and scientific terms used herein have the same meaning as commonly understood by one having ordinary skill in the art to which the disclosure pertains.

Finally, as used in this specification and the appended claims, the singular forms "a," "an" and "the" include plural referents unless the content clearly dictates otherwise.

A device capable of motion may have one or more sources of navigational or positional information. Some embodiments described below are in the context of a portable, hand-held device that can be moved in space by a user and its motion, location and/or orientation in space therefore sensed The techniques of this disclosure can work with any type of portable device as desired, including a smartphone or the other exemplary devices noted below. So in one embodiment, the portable device may be a smartphone. In another embodiment, the portable device may be a wearable device. In other embodiments, it may be another type of portable device. It will be appreciated that such devices are often carried or associated with a user and thus may benefit from providing navigation solutions using a variety of inputs For example, such a handheld device may be a mobile phone (e.g., cellular phone, a phone running on a local network, or any other telephone handset), tablet, personal digital assistant (PDA), video game player, video game controller, navigation device, wearable device (e.g., glasses, watch, belt clip), fitness tracker, virtual or augmented reality equipment, mobile internet device (MID), personal navigation device (PND), digital still camera, digital video camera, binoculars, telephoto lens, portable music, video or media player, remote control, or other handheld device, or a combination of one or more of these devices However, the techniques of this disclosure may also be applied to other types of devices that are not handheld, including autonomous or piloted vehicles whether land-based, aerial, or underwater vehicles, or equipment that may be used with such vehicles As an illustration only and without limitation, the vehicle may be a drone, also known as an unmanned aerial vehicle (UAV).

As noted above, a device that determined a navigation solution may utilize external resources to develop a reference based solution such as GNSS or WLAN/cellular trilateration Such a device may also feature sensors, including accelerometers and gyroscopes, used to provide inertial navigation. In some embodiments, inertial sensor data may be fused with data from other sensors such as magnetometers or barometers to improve position or orientation determinations. According to this disclosure, one or more ultrasonic sensors may be used to perform a navigational or positional determination in that the ultrasonic based determination may be used to supplement these other navigational or positional determinations or may be used independently when the other determinations are not available.

Ultrasonic sensors are transducers that may be used to determine the relative location of objects using reflected sounds waves. Technological advances have led to the increasing miniaturization and refinement of these sensors, such that it now feasible to incorporate them into the devices that are the subject of this disclosure, including small portable devices such as smartphones and the like, and also other applications including autonomous or piloted vehicles such as drones. For example, an ultrasonic sensor may be implemented using as a micro electro mechanical system (MEMS), enabling fabrication on an integrated circuit or a chip. A number of benefits may be associated with the use of ultrasonic sensors as disclosed. For example, ultrasonic transducers exhibit low power consumption and are more energy efficient than other imaging techniques, such as digital optical sensors. As such, information from ultrasonic sensors may represent significant potential power savings as compared to using optical sensors such as cameras In some embodiments, it is expected that an ultrasonic sensor may be operated substantially continuously, even for devices that rely on batteries or other limited sources of power. Further, since ultrasonic sensors employ soundwaves, they are unaffected by ambient light, providing uniform performance across a wide variety of environment and conditions. As a further point of comparison to optical techniques, ultrasonic sensors do not require supplemental illumination in order to operate in dim or dark conditions. Still further, the use of optical imaging techniques present privacy and security concerns which may be avoided when using ultrasonic techniques The small size, light weight and low power consumption of such ultrasonic sensors make them usable in portable or wearable devices, As well as other applications including autonomous or piloted vehicles such as drones (especially those of small size).

As desired, different object detection capabilities may be achieved by varying the number of transducers. For example, a single element generally be used to provide information in one dimension, two elements may be used to form a linear array to provide information in two dimensions and three element in a planar array may provide information in three dimensions. Using conventional techniques, ultrasonic sensors may be used to gather a wide variety of information regarding the surrounding environment. Ranging techniques using time of flight measurements of a reflected signal may be employed to determine distance to an external object from a transducer. When an array of transducers is employed, relative direction information to an external object may be determined as well, either as an angle and a distance with respect to a linear array or a full three dimensional position with respect to a planar array Further, by measuring shifts in signal frequency, an ultrasonic sensor may use Doppler techniques to determine the relative speed between the device and an external object As described in the following materials, one or more of these techniques may be used to determine a navigational constraint that may in turn be used when providing a navigation solution for the device. Notably, ultrasonic sensor may be implemented using systems that are not subject to the time-varying drift associated with the types of inertial sensors typically employed in personal electronics, and may therefore provide a valuable supplement to navigation solutions employing on such inertial sensors.

Correspondingly, at least one ultrasonic sensor of a portable device may be used to capture a plurality of samples By using suitable ranging techniques, relative location information may be determined for one or more external objects. Relative location information may include distance and/or relative direction information. In some embodiments, differences between samples may be subjected to flow analysis As such, processing the samples form the ultrasonic sensor may be used to determine a constraint regarding motion of the device incorporating the sensor. In one aspect, one or more navigation parameters may be extracted from the samples. As desired, the constraint may be used to provide a navigation solution independent of other techniques or may be used to supplement at least one other source of navigation information In one aspect, determining the constraint may include determining a context of the device. For example, the context may be static or in motion. Once motion has been determined, meaningful motion may be distinguished from non-meaningful, or fidgeting, motion. In applications involving a portable device, determining the context may include determining how the device is being used, such as for a smartphone distinguishing between being held in a texting mode, "in hand," and being held against the user's ear during a telephone call, "on ear." In one aspect, determining the constraint may include determining a speed or velocity of the portable device from the samples. In one aspect, determining the constraint may include estimating relative heading changes In one aspect, determining the constraint may include estimating a misalignment angle of the device with respect to a platform, wherein the platform represents the device moving under its own power or a means of conveyance, such as when the device is in a vehicle or carried by a user. Estimating the misalignment angle may allow determination of a direction of motion of the platform or platform heading. The orientation of a device within a platform is not necessarily representative of the orientation of the platform The device may undergo any number of rotational movements along any of its major axes with respect to the platform. Accordingly, these rotational movements of the device do not indicate that the platform is going through the same changes in orientation, such as when the device is portable and is unconstrained within or by the platform. In other embodiments, such as when the device is a self-powered or autonomous vehicle, the device heading and the platform heading may be the same or may not be the same depending on the type of vehicle.

These and other aspects of this disclosure may be appreciated in the context of FIG. 1, which depicts features of a suitable device 100 with high level schematic blocks. As will be appreciated, device 100 may be implemented as a device or apparatus, such a portable or handheld device as described above. Although embodiments of this disclosure may be described in the context of being a portable device, these techniques may also be applied to substantially any device that is capable of motion, including non-handheld devices As shown, device 100 includes a host processor 102, which may be one or more microprocessors, central processing units (CPUs), or other processors to run software programs, which may be stored in memory 104, associated with the functions of device 100. Multiple layers of software can be provided in memory 104, which may be any combination of computer readable medium such as electronic memory or other storage medium such as hard disk, ultrasonic disk, etc., for use with the host processor 102 For example, an operating system layer can be provided for device 100 to control and manage system resources in real time, enable functions of application software and other layers, and interface application programs with other software and functions of device 100. Similarly, different software application programs such as menu navigation software, games, camera function control, navigation software, communications software, such as telephony or wireless local area network (WLAN) software, or any of a wide variety of other software and functional interfaces can be provided. In some embodiments, multiple different applications can be provided on a single device 100, and in some of those embodiments, multiple applications can run simultaneously Device 100 may also include integrated motion processing unit (MPU™) 106 featuring sensor processor 108, memory 110 and inertial sensor 112. Memory 110 may store algorithms, routines or other instructions for processing data output by sensor 112 and/or other sensors as described below using logic or controllers of sensor processor 108, as well as storing raw data and/or motion data output by inertial sensor 112 or other sensors. Inertial sensor 112 may be one or more sensors for measuring motion of device 100 in space. Depending on the configuration, MPU 106 measures one or more axes of rotation and/or one or more axes of acceleration of the device. In one embodiment, inertial sensor 112 may include rotational motion sensors or linear motion sensors. For example, the rotational motion sensors may be gyroscopes to measure angular velocity along one or more orthogonal axes and the linear motion sensors may be accelerometers to measure linear acceleration along one or more orthogonal axes. Sensor data or readings from the gyroscope may be used to calculate a heading for device 100. In one aspect, three gyroscopes and three accelerometers may be employed, such that a sensor fusion operation performed by sensor processor 108, or other processing resources of device 100, combines data from inertial sensor 112 to provide a six axis determination of motion. Information from inertial sensor 112 may be used to provide an inertial navigation solution that is based, at least in part, on dead reckoning techniques. As desired, inertial sensor 112 may be implemented using MEMS to be integrated with MPU 106 in a single package. Exemplary details regarding suitable configurations of host processor 102 and MPU 106 may be found in co-pending, commonly owned U.S. patent application Ser. No. 11/774,488, filed Jul. 6, 2007, and Ser. No. 12/106,921, filed Apr. 11, 2008, which are hereby incorporated by reference in their entirety. Suitable implementations for MPU 106 in device 100 are available from InvenSense, Inc. of Sunnyvale, Calif.

Device 100 may also include at least one ultrasonic sensor 114, such as a MEMS-based transducer or an array of such transducers. Ultrasonic sensor 114 outputs samples to ultrasonic navigation module 116. As will be described in further detail below, ultrasonic navigation module 116 may perform one or more algorithms or operations on the samples to determine a navigational constraint according to the techniques of this disclosure One or more additional sensors, such as auxiliary sensor 118, may also be optionally provided. In other embodiments, no auxiliary sensor is necessary. Auxiliary sensor 118 may be configured to measure one or more aspects about the environment surrounding device 100. For example, a barometer and/or a magnetometer may be used to refine position determinations made using inertial sensor 112 Sensor data or readings from the magnetometer may be used to calculate a heading for device 100. In one embodiment, auxiliary sensor 118 may include a magnetometer measuring along three orthogonal axes and output data to be fused with the gyroscope and accelerometer inertial sensor data to provide a nine axis determination of motion. In another embodiment, auxiliary sensor 118 may also include a barometer to provide an altitude determination that may be fused with the other sensor data to provide a ten axis determination of motion Although described in the context of one or more sensors being MEMS based, the techniques of this disclosure may be applied to any sensor design or implementation. Further, device 100 may also optionally include one or more components for capturing images, such as image sensor 120, which may be one or more of an optical camera, a thermal camera, an infra-red imaging sensor or other similar apparatuses. In other embodiments, no image sensor is necessary As noted above, device 100 may optionally have location awareness capabilities, such as may be obtained from a source of absolute navigation information and provided by location module 122. In other embodiments, no location module is necessary. Absolute navigation information refers to the use of any suitable technique to determine the geospatial position of device 100. One of skill in the art will appreciate that any number of technologies may be implemented as desired Without limitation, examples of suitable sources of absolute navigation information include global navigation satellite systems (GNSS), such as global positioning system (GPS), global navigation satellite system (GLONASS), Galileo and Beidou, as well as WiFi™ positioning, cellular tower positioning, Bluetooth™ positioning beacons or other similar methods. Location module 122 may also be configured to use information from a wireless communication protocol to provide a position determination using signal trilateration. Any suitable protocol, including cellular-based and wireless local area network (WLAN) technologies such as Universal Terrestrial Radio Access (UIRA), Code Division Multiple Access (CDMA) networks, Global System for Mobile Communications (GSM), the Institute of Electrical and Electronics Engineers (IEEE) 802.16 (WiMAX), Long Term Evolution (LTE), IEEE 802.11 (WiFi™) and others may be employed.

In the embodiment shown, host processor 102, memory 104, MPU 106 and other components of device 100 may be coupled through bus 124, which may be any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral inter face (SPI) or other equivalent. Depending on the architecture, different bus configurations may be employed as desired. For example, additional buses may be used to couple the various components of device 100, such as by using a dedicated bus between host processor 102 and memory 104. As noted above, multiple layers of software may be employed as desired and stored in any combination of memory 104, memory 110, or other suitable location For example, a motion algorithm layer can provide motion algorithms that provide lower-level processing for raw sensor data provided from the motion sensors and other sensors A sensor device driver layer may provide a software interface to the hardware sensors of device 100. Further, a suitable application program interface (API) may be provided to facilitate communication between host processor 102, MPU 106 and ultrasonic navigation module 116, for example, to transmit desired sensor processing tasks.

Other embodiments may feature any desired division of processing between host processor 102, MPU 106 and ultrasonic navigation module 116, as appropriate for the applications and/or hardware being employed Ultrasonic navigation module 116 may be implemented as any suitable combination of hardware and software to perform the desired operations and algorithms on samples from ultrasonic sensor 114 to determine a navigational constraint. Aspects implemented in software may include but is not limited to, application software, firmware, resident software, microcode, etc, and may take the form of a computer program product accessible from a computer-usable or computer-readable medium providing program code for use by or in connection with a computer or any instruction execution system, such as host processor 102, sensor processor 108, a dedicated processor or any other processing resources of device 100.

As noted above, the techniques of this disclosure include capturing a plurality of samples, such as by using ultrasonic sensor 114 of device 100. Ultrasonic navigation module 116 may process the samples to determine a constraint regarding motion of device 100 to be used in a navigational solution. The following embodiments describe suitable operations that may be performed by ultrasonic navigation module 116. These are intended to illustrate examples only and should not be construed as limiting. As will be appreciated, not all operations may be performed depending on the embodiment. Further, other equivalent operations may be substituted as known to those of skill in the art In one aspect, processing the sequence of samples from the ultrasonic sensor comprises performing an ultrasonic flow analysis. Performing the ultrasonic flow analysis may include determining change in relative location to an external object. Determining a navigational constraint may include estimating a device angle Determining a navigational constraint may include estimating a misalignment angle of the device with respect to a direction of motion. When the device includes inertial sensors, a navigation routine may be per formed using the inertial sensors and the navigational constraint may be applied to a navigational solution provided by the inertial navigation routine. The sequence of samples from the ultrasonic sensor may be processed using a Doppler analysis to determine a speed of the device and the determined speed may be applied to the navigational solution.

In one aspect, the sequence of samples from the ultrasonic sensor may be processed using a Doppler analysis, and determining the navigational constraint may include estimating relative heading changes obtained with respect to an external object based at least in part on the Doppler analysis. The device may include inertial sensors and a navigation routine may be performed using the inertial sensors so that the navigational constraint may be applied to a navigational solution provided by the inertial navigation routine. Further, the sequence of samples from the ultrasonic sensor may be processed using a Doppler analysis to determine a speed of the device and the determined speed may be applied to the navigational solution.

In one aspect, determining the navigational constraint may include estimating relative heading changes obtained with respect to an external object. The sequence of samples from the ultrasonic sensor may be processed using a Doppler analysis to determine a speed of the device and the determined speed may be applied to the navigational solution.

In one aspect, processing the sequence of samples from the ultrasonic sensor may also include determining a distance to an external object by ranging. Processing the sequence of samples from the ultrasonic sensor may include performing an ultrasonic flow analysis and determining a navigational constraint may include estimating a speed of the device based at least in part on the ultrasonic flow analysis and the determined distance to the external object. Estimating the speed includes deriving a scale factor from the determined distance to the external object In some embodiments, device 100 may have a supplemental sensor with imaging capabilities in the form of imaging sensor 120, which may be one or more of an optical camera, a thermal camera, an infra-red imaging sensor or other similar optical sensors. Many of the techniques described above with respect to ultrasonic flow analysis may be adapted and applied to digital images, such as by performing a pixel-based flow analysis Techniques specific to image analysis may also be used in such embodiments Further explanations and details regarding such use of imaging sensors are provided in co-pending, commonly-assigned U.S. patent application Ser. No. 14/530,494, filed Oct. 31, 2014, which is hereby incorporated by reference in its entirety. Ultrasonic navigation module 116 may also use any of those techniques, or others, to determine one or more navigational constraints from a sequence of samples from imaging sensor 120. These constraints may then be used in conjunction with the ultrasonic-based techniques of this disclosure In one aspect, a sequence of samples from the supplemental sensor may be processed to perform a flow analysis Determining a navigational constraint may include estimating a speed of the device based at least in part on the flow analysis and the determined distance to the external object. When the device includes inertial sensors, a navigation routine may be performed using the inertial sensors and the navigational constraint may be applied to a navigational solution provided by the inertial navigation routine Performing the optical flow analysis may include aggregating estimations of pixel translations between the samples from the supplemental sensor.

In one aspect, processing the sequence of samples from the ultrasonic sensor may also include determining a distance to an external object by ranging and when the device includes a gyroscope, estimating a speed of the device based at least in part on the ultrasonic flow analysis, estimating a misalignment angle of the device based at least in part on the ultrasonic flow analysis and the determined distance to the external object and providing a navigational solution based at least in part on the estimated speed, the estimated misalignment angle and information from the gyroscope In one aspect, processing the sequence of samples from the ultrasonic sensor may also include determining a distance to an external object by ranging and when the device includes a magnetometer, estimating a speed of the device based at least in part on the ultrasonic flow analysis and the determined distance to the external object, estimating a misalignment angle of the device based at least in part on the ultrasonic flow analysis and providing a navigational solution based at least in part on the estimated speed, the estimated misalignment angle and information from the magnetometer.

In one aspect, determining a navigational constraint may include determining a context for the device. Processing the sequence of samples from the ultrasonic sensor may include performing an ultrasonic flow analysis and determining a navigational constraint may include estimating a device angle The context of the device may be determined by assessing variance in a plurality of estimated device angles. Determining the context of the device may include comparing similarity between samples. A usage of the device may be determined based at least in part on the estimated device angle. Determining the usage of the device may also be based at least in part on an orientation determination using an inertial sensor The determined context may correspond to being static or to fidgeting motion. Alternatively or in addition, the determined context may correspond to a dangling motion. A misalignment angle of the device with respect to a direction of motion based at least in part on the dangling motion context This disclosure also includes a portable device having an ultrasonic sensor and an ultrasonic navigation module, wherein the ultrasonic navigation module is configured to process a sequence of samples from the ultrasonic sensor of the portable device, determine a navigational constraint for the portable device based at least in part on the processed samples and provide a navigation solution for the portable device based at least in part on the determined constraint.

In one aspect, the ultrasonic navigation module may process the sequence of samples by performing an ultrasonic flow analysis. The ultrasonic navigation module may perform the ultrasonic flow analysis to determine a change in relative location to an external object. The ultrasonic navigation module may perform the ultrasonic flow analysis to estimate a device angle. The ultrasonic navigation module may perform the ultrasonic flow analysis to estimate a misalignment angle of the device with respect to a direction of motion. The ultrasonic navigation module may perform the ultrasonic flow analysis to estimate relative heading changes obtained with respect to an external object In one aspect, the ultrasonic navigation module may process the sequence of samples from the ultrasonic sensor using a Doppler analysis, so that the ultrasonic navigation module may estimate relative heading changes obtained with respect to an external object based at least in part on the Doppler analysis In one aspect, the ultrasonic navigation module map process the sequence of samples from the ultrasonic sensor using a Doppler analysis to determine a speed of the device and apply the determined speed to the navigational solution.

In one aspect, the device may include inertial sensors and the ultrasonic navigation module may apply the determined navigational constraint to a navigational solution derived from the inertial sensors.

In one aspect, the device may include a supplemental sensor and the ultrasonic navigation module may process a sequence of samples from the supplemental sensor to perform a flow analysis and determine a navigational constraint. The supplemental sensor may be an optical sensor. The supplemental sensor may be at least one of: (i) an optical camera; (ii) a thermal camera; (iii) an infra-red imaging sensor.

In one aspect, the device may include a gyroscope and the ultrasonic navigation module may process the sequence of samples from the ultrasonic sensor to determine a distance to an external object by ranging, may perform an ultrasonic flow analysis on the sequence of samples, may estimate a speed of the device based at least in part on the ultrasonic flow analysis and the determined distance to the external object, may estimate a misalignment angle of the device based at least in part on the ultrasonic flow analysis and may provide a navigational solution based at least in part on the estimated speed, the estimated misalignment angle and information from the gyroscope In one aspect, the device may include a magnetometer and the ultrasonic navigation module may process the sequence of samples from the ultrasonic sensor to determine a distance to an external object by ranging, may perform an ultrasonic flow analysis on the sequence of samples, may estimate a speed of the device based at least in part on the ultrasonic flow analysis and the determined distance to the external object, may estimate a misalignment angle of the device based at least in part on the ultrasonic flow analysis and may provide a navigational solution based at least in part on the estimated speed, the estimated misalignment angle and information from the magnetometer.

In one aspect, the device may include a gyroscope and the ultrasonic navigation module may process the sequence of samples from the ultrasonic sensor using a Doppler analysis to estimate a speed of the device, may perform an ultrasonic flow analysis on the sequence of samples, may estimate a misalignment angle of the device based at least in part on the ultrasonic flow analysis and may provide a navigational solution based at least in part on the estimated speed, the estimated misalignment angle and information from the gyroscope.

In one aspect, the device may include a magnetometer and the ultrasonic navigation module may process the sequence of samples from the ultrasonic sensor using a Doppler analysis to estimate a speed of the device, may perform an ultrasonic flow analysis on the sequence of samples, may estimate a misalignment angle of the device based at least in part on the ultrasonic flow analysis and may provide a navigational solution based at least in part on the estimated speed, the estimated misalignment angle and information from the magnetometer.

In one aspect, the ultrasonic navigation module may perform the ultrasonic flow analysis to determine a context for the device.

Non-limiting examples of suitable operations that may be performed for each of these stages are described in the material below.

EXAMPLES

The present method and apparatus works with different device usages and orientations with respect to a platform, such as a pedestrian or the vehicle itself. With respect to embodiments in the context of pedestrian user, different usages and orientations of the device will be referred to herein as use cases. The use cases are such as, for example: (i) handheld with all the different possible orientations including compass, texting portrait, texting landscape, or any arbitrary orientation (including any roll, pitch and heading); (ii) hand dangling (also called hand swinging) in any orientation whether horizontal or vertical, and in various types of dangling including very light, light, normal, or strong swinging; (iii) ear, which means the pedestrian holds the device on or neat his ear for listening/talking in any orientation including horizontal, vertical or tilted; (iv) on the wrist (such as for example a smartwatch) in any orientation including horizontal, vertical or tilted; (v) head mounted (such as smart glasses, smart goggles, ear mounted systems, system on helmet, or any other sort of head mounted system); (vi) running with the device in any of the above use cases or tethered to any part of the body with any device orientation or tilt for example horizontal, vertical, or tilted in any pose, some examples are leg, arm, wrist, or any way of carrying. In all device usages and orientations the present method can work with any toll, pitch, and azimuth (heading) angles of the device.

As noted, information from ultrasonic sensor 114 may be employed to determine one or more navigational constraints regarding device 100, so that a navigational solution may be provided using the navigational constraint(s). Depending on the embodiment and the desired application, the navigational constraint may be misalignment only, speed only, relative heading changes only, or any combination of these Further details of the estimation of misalignment, speed, and relative heading changes will be discussed in this example section The discussion in the example section will start by discussing the misalignment estimation. The present method and apparatus is able to calculate a continuous misalignment angle covering the whole misalignment space, not just discrete or pre-determined values of such angle based on discrete use case classification of the device.

During normal use, the attitude of a device (e.g. portable phone) changes freely. Indeed, such devices often undergo rotational movements along any of their major axes (e.g. the x-axis, y-axis and z-axis) when positioned, for example, for texting in either landscape of portrait view or near a user's ear during phone use (these are examples when the device is a phone) One possible definition of axes is as follows, the forward axis of the device is defined as x-axis, the vertical or z-axis is pointing downward and the transversal axis or y-axis is defined in a way to complete the right handed coordinate system.

The orientation of a device within a platform (in the current disclosure a pedestrian carrying, holding or using the device) is not representative of the orientation of the platform or pedestrian. The device may undergo any number of rotational movements along any of its major axes, with respect to the platform. These rotational movements of the device do not indicate that the platform is going through the same changes in orientation. For example, the user or platform may be moving on a leveled 2D plane while the device may be undergoing any number of possible roll and pitch angles Typical portable devices include a tri-axial accelerometer for measuring accelerations or specific forces, along each of the sensitive axis, i.e., the x-axis, y-axis and the z-axis. The device may contain other sensors such as for example gyroscopes, magnetometers, barometer, among others.

Roll is defined as the rotation of the device along the forward x-axis, while pitch is the rotation along the lateral y-axis. Because the device user is free to rotate the device as desired, the device can have several changes in roll, pitch and azimuth (heading) with respect to the platform.

The presented method and apparatus uses measurements of the overall image translation as measured using ultrasonic flow of object(s) detected by a ultrasonic sensor, such as ultrasonic sensor 114, to estimate the misalignment angle or other navigational constraint It is to be noted that image here means the captured field of view of the ultrasonic image at a certain instant of time.

Ultrasonic values and/or the pitch and roll values may be used to classify whether the device is undergoing non-periodic motion that is indicative of texting, calling, or vertical mode, or periodic motion that is indicative of dangling. The pitch and roll values may be calculated from any one of the following among others: (i) gyroscopes through any one of different methods such as for example quaternions, (ii) accelerometer readings or averaged accelerometer readings (whether fixed-time average or moving average), (iii) integrated navigation solution using any type of integration technique and integrating different sensors and/or systems such as for example some or all of the following: accelerometers, gyroscopes, magnetometers, barometers, odometers, or any navigational information updates (such as, for example, GNSS, WiFi, or any other wireless technique). The roll and pitch values used for levelling may be instantaneous sample values or may be time averaged values (whether fixed time average or moving average) whether buffered or fed to the presented method epoch by epoch (each epoch corresponds to an accelerometer reading sample).

In texting or calling mode (e.g. modes in which the device is facing the ground or a wall), the arctangent of the ratio of vertical to horizontal translation in the image stream provides the device angle. This is possible because the camera axis is aligned to the device axis.

In the dangling use case, the comparison of the cumulative flow value integrated over the positive and negative half-cycles of the dangling period is used to determine the device angle.

An optional step to make the buffered signals smooth; an LPF may be applied to the buffers.

An optional routine to give a misalignment angle output in case the main method gives a "no decision" output may be used; such routine is based on the history of any one or any combination of the following: (i) the buffered history of the corrected misalignment angle, (ii) the buffered history of the roll and pitch angles, (iii) the buffered history of the ultrasonic flow values, or (iv) the buffered history of the azimuth (heading) angle.

An optional routine to enhance the misalignment angle calculation may be used, such routine is based on the history of any one or any combination of the following: (i) the buffered history of the corrected misalignment angle, (ii) the buffered history of the roll and pitch angles, (iii) the buffered history of the ultrasonic flow values, or (iv) the buffeted history of the azimuth (heading) angle. This routine may rely on smoothing, averaging, or any type of filtering of any one or any combination of the above list of buffered quantities In some embodiments, an optional routine may be used to integrate the misalignment angle obtained using ultrasonic sensor with the misalignment angle obtained using other means such as inertial sensors using averaging or any type of filtering or state estimation known to those skilled in the art An optional routine that calculates a standard deviation of the calculated misalignment angle may be used In one embodiment, this routine may rely on the consistency of any one or any combination of the following: (i) the buffered history of the corrected misalignment angle, (ii) the buffered history of the roll and pitch angles, (iii) the buffered history of the aggregated optical flow values, or (iv) the buffered history of the azimuth (heading) angle.

An optional routine to enhance the misalignment angle calculation of the present method when absolute navigational information (such as for example GNSS or WiFi among others) is available and capable of calculating a pedestrian or platform heading may be used. This means having a redundancy of information, for example: (i) device heading from one or more its self-contained sensors, a fused version of its self-contained sensors, or from an integrated navigation solution; (ii) misalignment from the present method; (iii) pedestrian heading from the absolute navigational information. In one embodiment, the information from (i) and (iii) can be used to calculate another version of misalignment between device and pedestrian that can enhance, be integrated or fused with, be averaged or filtered with the misalignment from (ii). In another embodiment, the other version of misalignment between device and pedestrian calculated from (i) and (iii) can be used with a machine learning or training technique together with the misalignment from (ii) (especially when the misalignment from (ii) has a poor performance possibly indicated by the optional calculation of its standard deviation) to obtain better misalignment in the same use cases even if those use cases occurred later in a navigation session or trajectory when the absolute navigational information is blocked, interrupted or degraded In yet another embodiment, both the preceding two ideas can both be applied in a third embodiment.

Any one or any combination of the optional routines can be used.

It should be noted that the present method may be used in a variety of applications including those that involve 2D or 3D navigation solutions including:
2D or 3D position, velocity and attitude or
only 2D or 3D position and attitude,
or partial 2D or 3D navigation solutions including:
only 2D or 3D velocity and attitude or
only 2D or 3D attitude.

In case of 2D solutions, attitude is only the azimuth (heading) angle.

As an example application, the present method may be used with a pedestrian dead-reckoning (PDR) solution. PDR needs a pedestrian heading (azimuth) together with step detection and step length. The sensors in the device (such as for example accelerometers, gyroscopes, and magnetometers) can only give the device heading (azimuth) not the pedestrian heading These two are not the same and have a misalignment between them depending on the use case of the device So, if there is no absolute navigational information (such as for example GNSS or WiFi), or if the quality or nature of any available absolute navigational information is not adequate or not capable of calculating a pedestrian heading, then misalignment between device heading and pedestrian heading is needed in order to calculate the pedestrian heading given the device heading obtained from its self-contained sensors. The calculated pedestrian heading will be used for PDR. Even in cases where absolute navigational information is available, and the device heading and the misalignment can be used to calculate a pedestrian heading to be used for PDR, then this solution can be integrated with the absolute navigational information to give a better solution that mitigates the drawbacks of both dead-reckoning and absolute navigational information. Any state estimation or filtering technique can be used for such integration.

In another example application, the misalignment angle from the present method can be used with any 2D or 3D navigation application wherein motion constraints that need this misalignment angle are applied to enhance the positioning or navigation solution (without any physical constraint on the usage of the device) such as, for example:

Non Holonomic Constraints (NHC): NHC is in the moving platform flame (which is here the pedestrian frame); so in order to apply NHC the transformation between the device frame and the pedestrian flame is needed which relies on the misalignment angle obtained by the present method.

PDR applied as a constraint to another integrated navigation solution whether a 2D or 3D navigation solution, thereby providing improved positioning performance with low-cost sensors rather than general inertial navigation. The dependence of PDR on the misalignment angle calculated by the present method is explained earlier. In general, the PDR results can be used in any of the following ways: i) to provide measurement updates for the navigation solution (in addition to the possible calculation of the standard deviations for these updates), ii) to be integrated with the navigation solution in a Least Squares sense, or iii) to be used as the only standalone positioning and navigation solution (as described above).

Map constraints: if environment maps (of any type) are available, the map constraints can be used to enhance the navigation solution. In order to use such constraints the pedestrian heading is needed, which can be calculated from the device heading and the misalignment calculated by the present method. If there is no absolute navigational information (such as for example GNSS or WiFi), or if the quality or nature of any available absolute navigational information is not adequate or not capable of calculating a pedestrian heading, then misalignment between device heading and pedestrian heading is used to calculate the pedestrian heading given the device heading obtained from the self-contained sensors. The calculated pedestrian heading will be used for the map constraint for the navigation solution. Even in cases where absolute navigational information is available, the device heading and the misalignment can be used to calculate a pedestrian heading to be further integrated with the absolute navigational information to give a better solution The map constraints to enhance a navigation solution can be used if PDR is utilized to further enhance the solution, or can be used if PDR is not used to enhance the main navigation solution When the method presented herein is combined in any way with a navigation solution whether 2D or 3D, this navigation solution can use any type of state estimation or filtering techniques. The state estimation technique can be linear, nonlinear or a combination thereof. Different examples of techniques used in the navigation solution may rely on a Kalman filter, an Extended Kalman filter, a non-linear filter such as a particle filter, or an artificial intelligence technique such as Neural Network or Fuzzy systems The state estimation technique used in the navigation solution can use any type of system and/or measurement models The navigation solution may follow any scheme for integrating the different sensors and systems, such as for example a loosely coupled integration scheme or a tightly coupled integration scheme among others. The navigation solution may utilize modeling (whether with linear or non-linear, short memory length or long memory length) and/or automatic calibration for the errors of inertial sensors and/or other sensors used As mentioned before, information from ultrasonic sensor 114 may be employed to determine one or more navigational constraints regarding device 100, so that a navigational solution may be provided using the navigational constraint(s). Depending on the embodiment and the desired application, the navigational constraint may be misalignment only, speed only, relative heading changes only, or any combination of these.

Figure 2:
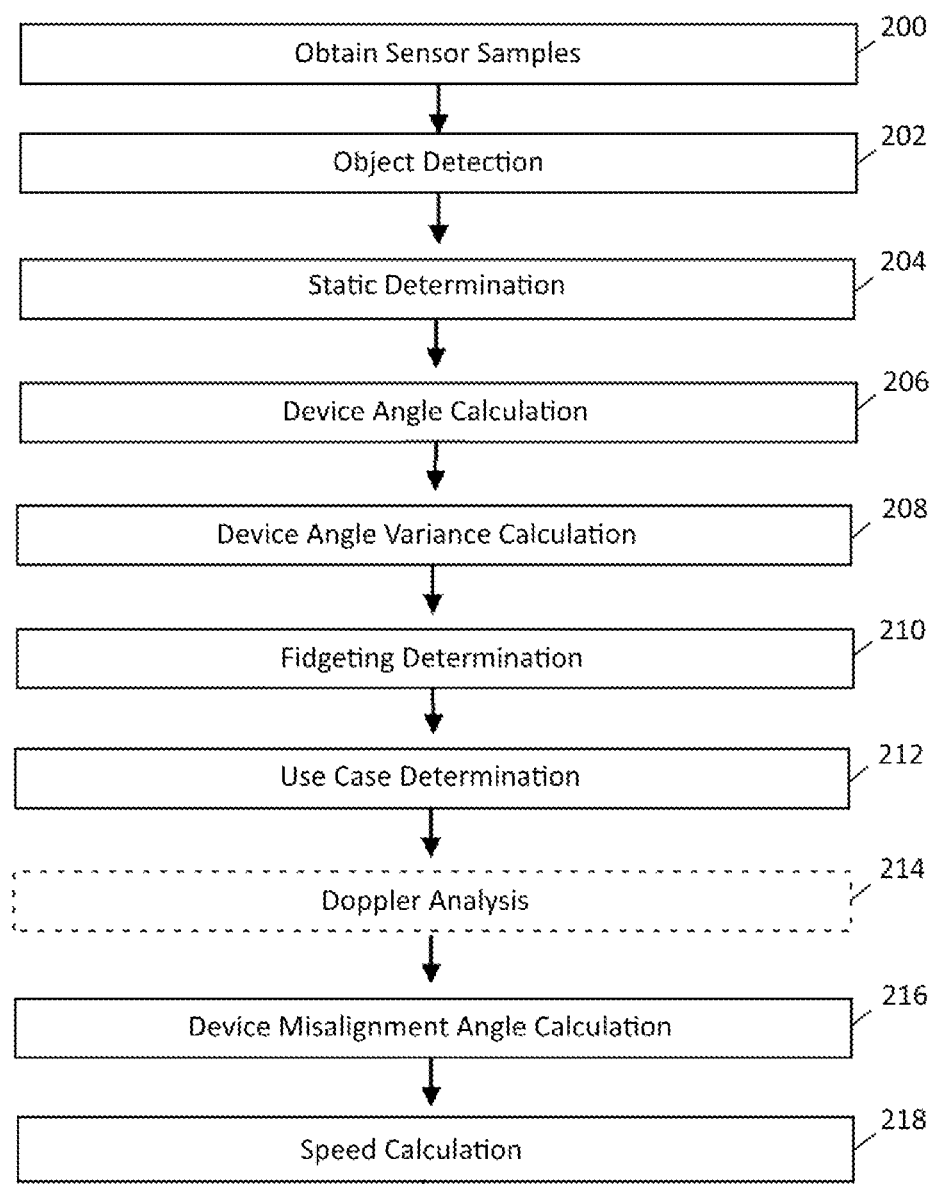
FIG. 2 is a flowchart showing a routine for providing a navigation solution for a portable device according to an embodiment.

As an illustration of one embodiment in which misalignment and speed of device 100 are both determined, ultrasonic navigation module 116 may be configured to perform the operations represented by the flowchart shown in FIG. 2 to extract relevant information from the samples. The samples may be processed to determine one or more navigational constraints for device 100. Beginning with 200, the samples from ultrasonic sensor 114 may be may be obtained.

In one aspect, the samples from ultrasonic sensor 114 may be processed to confirm that at least one object is detected within a suitable range to perform ultrasonic flow analysis. When an object or objects are available, any suitable number of samples from ultrasonic sensor 114 may be compared to determine whether the device is being held static or is undergoing motion. Once it is determined that the device is motion, the ultrasonic flow may be calculated between current sample and one or more previously acquired samples.

For example, in 202, ranging techniques may be applied to the samples to detect one or more external objects and determine relative location information for the detected object(s) A comparison of the relative location information between samples may be used to determine whether the device is in a static context in 204 by using flow analysis If not in a motion-less state, ultrasonic navigation module 116 may use flow analysis to calculate the angle of device 100 with respect to one or more of the external objects. Then, in 208, variance in the calculated device angle is assessed to further determine the context of device 100. For example, based on the variance of device angle, ultrasonic navigation module 116 may determine whether the motion is non-meaningful and may be categorized as fidgeting in 210 Otherwise, in 212 ultrasonic navigation module 116 determines the motion is meaningful and refines the context currently ascribed to device 100 For example, a smartphone device may be determined to be used in a texting mode or a calling mode In 214, in some embodiments, a Doppler analysis may be per formed with respect to the reflected signal to determine velocity between one or more external objects and device 100. This aspect is optional as indicated by the dashed box in FIG. 2 and need not be performed in all embodiments. In 216, a misalignment angle of device 100 with respect to a platform may be determined. The platform may be the means of conveyance of device 100, such as when carried by a vehicle or user, or may represent the device itself in embodiments for which the device is self-powered As desired, the misalignment angle may be used to determine a direction of motion of the platform, which may also be termed the platform heading. In 218, a current speed of device 100 may be determined, either as a magnitude of the velocity determined in 214 or from flow analysis of the samples or both. For example, in embodiments of device 100 that are portable, Doppler alone may be used when determining speed and/or a change in the angle between the device and one or more external objects.

As noted, this disclosure includes methods for navigating with a device In one aspect, a suitable method includes processing a sequence of samples from an ultrasonic sensor of the device, determining a navigational constraint for the device based at least in part on the processed samples and providing a navigation solution for the device based at least in part on the determined constraint. Accordingly, the embodiment represented in FIG. 2 is for the purpose of illustration only and not limitation. In other embodiments, misalignment only may be determined, speed only may be determined, relative heading changes only may be determined, or any combination of these quantities may be determined as desired With respect to 202, any suitable ranging techniques may be applied to detect and determine relative location information for one or more external objects In general, an external object may be detected when an ultrasonic wave transmitted by ultrasonic sensor 114 reflects off the external object ("echoes") and is then received Further, distance from an external object to a transducer of ultrasonic sensor 114 may be determined using time of flight calculations for the transmitted and reflected signal As desired, the speed of sound used to perform the calculation may be compensated with temperature, altitude or other environmental information if available. When ultrasonic sensor 114 features a linear array of transducers (two or more), relative direction information for the external object may be determined. An angle to the external object with respect to the axis of the linear array may be determined based on the difference in time when the reflected signal is received at the individual transducers of the linear array. Correspondingly, the use of a planar array of transducers (three or more) permits determination of angles to the external object with respect to each of two axes of the planar array. In some embodiments, the two axes may be orthogonal By determining two angles with respect to the external object, together with distance, complete three dimensional relative location information for the external object may be provided. Further, beamforming techniques as known in the art may be applied to steer signals in a desired direction to improve performance when two or more transducers are employed. Transmit beamforming may be used to concentrate intensity of the signal toward an area having an external object Alternatively or in addition, receive beamforming may be used to concentrate reception from an area having an external object With respect to 204, detection of whether device 100 is in a static, motionless state may be determined by assessing the degree of similarity between samples from ultrasonic 114 in determined relative location information for one or more external objects With respect to 206, ultrasonic navigation module 116 may determine an angle of device 100 In one embodiment, device angle may be determined by calculating ultrasonic flow of the samples from ultrasonic sensor 114 Further, differences in the determined location information for one or more detected external objects may be analyzed to estimate relative changes in orientation and/or position between device 100 and the one or more external objects In one aspect, determination of device angle by ultrasonic navigation module 116 may be used to classify a current use of device 100. As such, a context determined for device 100 may include the current usage For example, device 100 may be a communications apparatus such as a cellular phone, allowing the user to conduct voice calls or to text In one embodiment, information from inertial sensor 112 regarding the pitch and/or roll of device 100 may be employed to distinguish between a primarily horizontal orientation, a primarily vertical orientation in front of the user and a sideways orientation, which for example may be against the user's ear for phoning use, "on ear" For example, pitch, roll, and device angle may be used to distinguish texting mode from calling mode. In one aspect, if the pitch is near 90° and misalignment is around 90 or −90°, device 100 may be construed to be speaker up with the camera to the side. In another aspect, if the roll is near 90 or −90° and the device angle is approximately 0 or 180°, the device may be construed to be held with the speaker backwards or forwards (respectively) and the camera is to the side. In both cases device 100 may be taken as being in on ear mode, while if neither case is satisfied, the device may be taken as being in texting mode. In other embodiments, similar determinations may be performed to classify other common uses of the portable device. In still other embodiments, host processor 102 may provide an indication of applications currently running on device 100 to provide an indication of the current use Consequently, the aggregate x and y flow velocities of a detected external object may be used to finalize the estimate for device angle depending on the determined usage Processing the samples provided by ultrasonic sensor 114 may provide a flow map $F_k(xy)$ where each element is a tuple indicating an estimate of the translational motion (dx,dy) undergone by a detected object or a portion of a detected object at location (x,y) between samples $G_k$ and $G_{k-1}$, for example In one aspect, a dual-channel flow map F may be split into two single-channel matrices $dx_k(x,y)$ and $dy_k(x,y)$ If desired, x- and y-components of the flow map elements may be summed to provide an aggregate translation. Further, range information may be incorporated to provide corresponding 3D calculations.

Accordingly, the determined translations may also be used to classify a use case for device 100, such as by discriminating between a use indicating a user's interaction with device 100 such as texting/calling or a use in which the user is simply carrying device 100, such as dangling. For example, the translation, aggregated or not, may be used to create a binary thresholded signal as shown in Equations (1) and (2):

$$dx_k^{binary} = \begin{cases} 1 & \text{if } dx_k > 0 \\ -1 & \text{if } dx_k < 0 \\ dx_{k-1}^{binary} & \text{if } dx_k = 0 \end{cases} \quad (1)$$

$$dy_k^{binary} = \begin{cases} 1 & \text{if } dy_k > 0 \\ -1 & \text{if } dy_k < 0 \\ dy_{k-1}^{binary} & \text{if } dy_k = 0 \end{cases} \quad (2)$$

Differencing the binary thresholded flow from the previous step allows determination of the transition points (if any) between forward and backwards movement as indicated by Equations (3) and (4):

$$D_{x,k} = dx_k^{binary} - dx_{k-1}^{binary} \quad (3)$$

$$D_{y,k} = dy_k^{binary} - dy_{k-1}^{binary} \quad (4)$$

When periodic spikes occur within the differenced signal from above, a dangling use case may be determined. For example, the dangling use case determination may be made based on peaks in the magnitude spectrum M of the Fourier transform Y of the differenced signal D over a window of N ultrasonic samples, for Equations (5) and (6):

$$Y_{x,m} = \sum_{j=0}^{N-1} D_{x,j} \omega_N^{(j-1)(m-1)} \quad (5)$$

$$Y_{y,m} = \sum_{j=0}^{N-1} D_{y,j} \omega_N^{(j-1)(m-1)} \quad (6)$$

In these equations, $\omega_N = e^{(-2\pi i)/N}$ is an Nth root of unity, and the magnitude spectrum may be given by Equations (7) and (8):

$$M_x = 2|Y_{x,m}| \quad (7)$$

$$M_y = 2|Y_{y,m}| \quad (8)$$

The magnitude spectrum may be thresholded and if a peak is found above a set threshold in the frequency range for example for walking cases a range of Hz, the use case may be classified as dangling. The frequency of the peak is taken as the dangling frequency, $f_{dangling}$ If a peak was not found, the use case may be classified as texting/calling.

Figure 3:
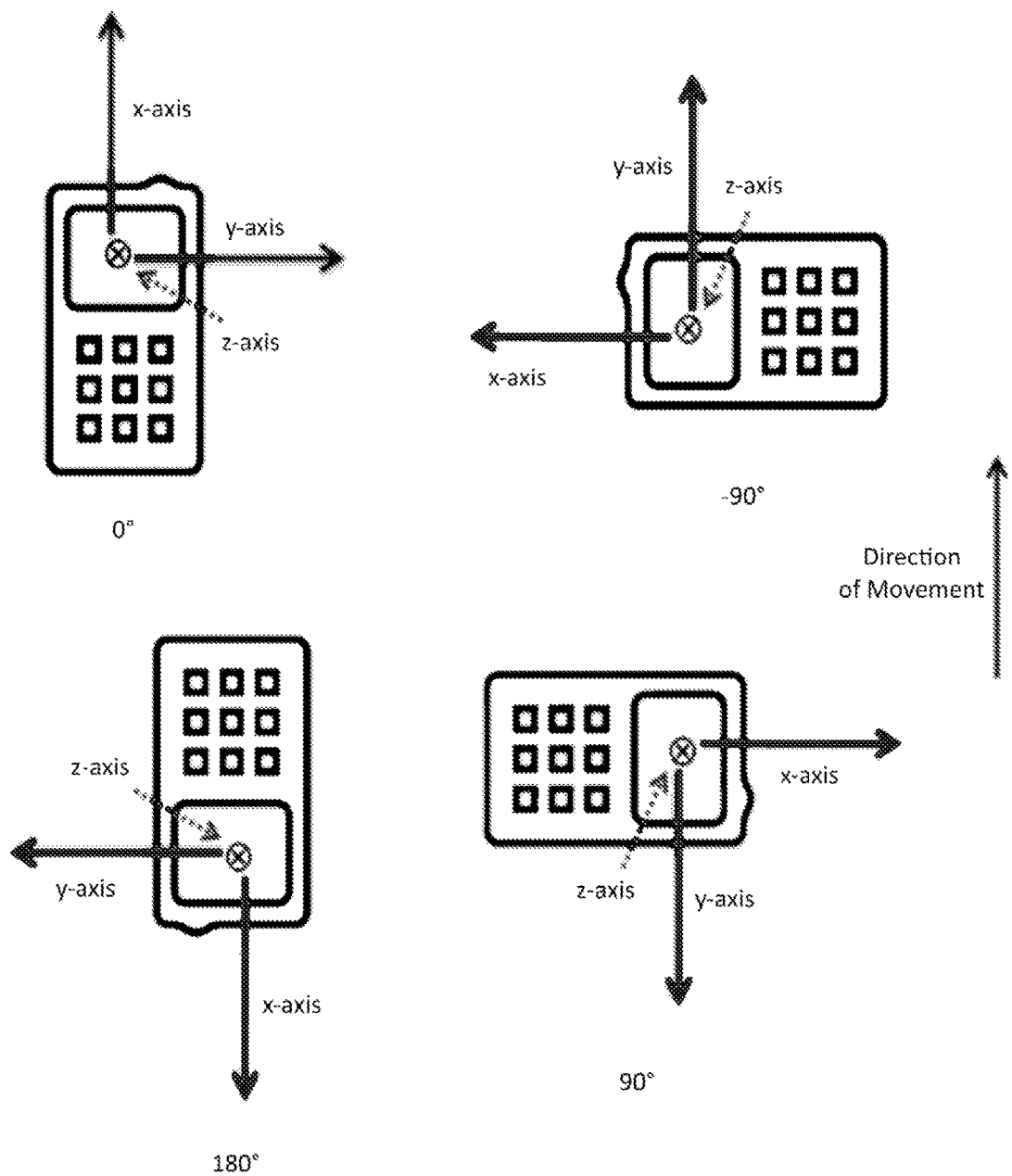
FIG. 3 is a schematic representation of common device angles that may be determined by ultrasonic flow calculations according to an embodiment

Thus, in one embodiment the current use of device 100 may be determined to be associated with a primarily horizontal orientation. Under such conditions, the device angle $\theta_k$ may be calculated according to Equation (9):

$$\theta_k = a\tan 2(dy, dx) \quad (9)$$

where dx and dy, are the respective translations of a detected object As desired, aggregate translations or the translation of a detected object or portion of a detected object may be employed. As shown, in FIG. 3, typical device angles of 0, 90, 180, and −90° with respect to the direction of motion are common when device 100 is employed in a primarily horizontal orientation. In each case, the z-axis runs perpendicularly into the page.

In one embodiment, the current use of device 100 may be determined to be associated with a primarily vertical orientation. For a vertical use case (e.g. walking down a hallway), using the field of view of ultrasonic sensor 114 may result in an incorrect determination of device angle. Rather, translations undergone by external objects adjacent the ground or floor may be more indicative of the device orientation By limiting the flow analysis to floor-associated objects, an improved estimation of device angle may be performed. For example, the field of view of ultrasonic sensor 114 may be partitioned into a grid of e equally-sized cells, such as 3×3 Correspondingly, flow analysis may be applied to external objects within one or more of the cells that may be expected to correspond to the floor. As illustrations only, when device 100 is held at an angle of 0°, the appropriate cell may be the bottom-middle cell and when device 100 is held at an angle of 90°, the appropriate cell may be the middle-right cell. Following a determination of a vertical use, the device angle θk may be computed using the values of the aggregate x- and y-translation of an external object within the ground or floor region as indicated by Equation (10):

$$\theta_k = a\tan 2(dy_{floor}, dx_{floor}) \quad (10)$$

where $dy_{floor}$ and $dx_{floor}$ are the respective translations of a detected object in the floor region, which as described above may be aggregate translations or may be a translation of one detected object or portion of a detected object.

If the use case has been classified as dangling (the classification of use case is described below), one technique for determining device angle may include differencing the binary thresholded flow ($D_x$ and $D_y$) and/or the maximum and minimum peaks in either the pitch or roll signals from the device's on-board IMU to obtain the transition points between the start of forward and backward dangling half-cycles. When the magnitude of the cumulative x flow over the full cycle is greater than that of the cumulative y flow over the full cycle and/or if the pitch is found to have a larger periodic signal than roll and/or if the x-flow exhibits greater periodicity than the y-flow (as shown by the magnitude spectrum of the differenced binary thresholded signal), the absolute values of the x-flows in each half-cycle may be integrated. If the cumulative x-flow, $dx_{cum}$, during the positive half cycle (PHC) is greater than the cumulative x-flow in the negative half-cycle (NHC), this indicates that the device is in the direction of the motion and the device angle is taken to be 0 degrees. Otherwise, the device is oriented against the direction of motion and the device angle is taken to be 180 degrees. These conditions may be expressed as Equation (11):

$$\theta_k = \begin{cases} 0 & \text{if } dx_{cum} \text{ in } PHC > dx_{cum} \text{ in } NHC \\ 180 & \text{else} \end{cases} \quad (11)$$

If the magnitude of the cumulative x flow over the full cycle is less than that of the cumulative y flow over the full cycle and/or if the roll is found to have a larger periodic signal than pitch and/or if the y-flow exhibits greater periodicity than the x-flow (as shown by the magnitude spectrum of the differenced binary thresholded signal), the absolute values of the aggregated y-flows in each half-cycle are integrated If the cumulative y-flow during the negative half cycle is greater than the cumulative y-flow in the positive half-cycle, the device angle is taken to be +90 degrees and otherwise, the device angle may be taken to be −90 degrees as indicated in Equation (12):

$$\theta_k = \begin{cases} 90 & \text{if } dy_{cum} \text{ in } NHC > dy_{cum} \text{ in } PHC \\ -90 & \text{else} \end{cases} \quad (12)$$

Figure 4:
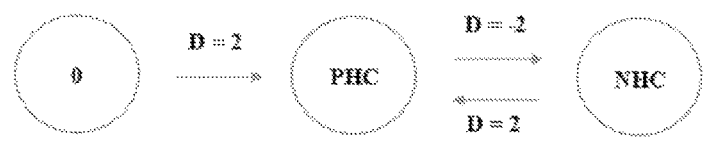
FIG. 4 is a state diagram for determining a dangling use case according to an embodiment

In one embodiment, a state machine may be used to keep track of whether the device is currently in the positive or negative half cycles of the dangling motion. An example state machine is depicted in FIG. 4 Beginning in the initialization state, a positive spike in the differenced binary thresholded flow signal (a value of +2) indicates that the device is experiencing a change from negative to positive flow and transitions the system to the PHC state. During the PHC state, a negative spike in the differenced binary thresholded flow signal (a value of −2) transitions the system to the NHC state, whereupon a positive spike transitions the system back to the PHC state The x- and y-flow values are integrated in each half-cycle and used in accordance with equations above to obtain a value for the dangling use case device angle.

As an illustration, when a device angle is approximately zero degrees, a strong flow in the positive x-direction may be expected with minor oscillations occurring in the y-direction due to ultrasonic flow from the left to the right side of the field of ultrasonic sensor 114, with a small amount of motion vertically due to the disturbances arising from the user's hand movements and steps. When a device angle is approximately 90 degrees, strong flow in the y-direction may be expected with a reduced, and possibly noisy, x-flow. Corresponding behavior may be expected for the orientations of 180 and −90 degrees. The arctangent of the ultrasonic flows may be used to estimate the device angle with respect to the user. Further, the ultrasonic flows may be smoothed if desired, such as by using a moving average window size of a suitable number of samples before calculating the device angle. As an illustration only and without limitation, the moving average window may be approximately 15 samples.

With respect to 208, ultrasonic navigation module 116 may determine a context for device 100 based on parameters extracted from the samples For example, determination of variance in the device angle over time may be used to classify motion of device 100 as meaningless fidgeting, corresponding to 210, or as meaningful, allowing for subsequent determination of context corresponding to 212 In one embodiment, the variance of device angle may be obtained using the values of the ultrasonic flow A normalized variance of device angle, $\sigma_\theta^2$, may be derived from Equations (13) and (14) for N samples:

$$R^2 = \left(\sum_{i=1}^{N} \cos\theta_i\right)^2 + \left(\sum_{i=1}^{N} \sin\theta_i\right)^2 \quad (13)$$

$$\sigma_\theta^2 = 1 - \frac{R}{N} \quad (14)$$

Figure 5:
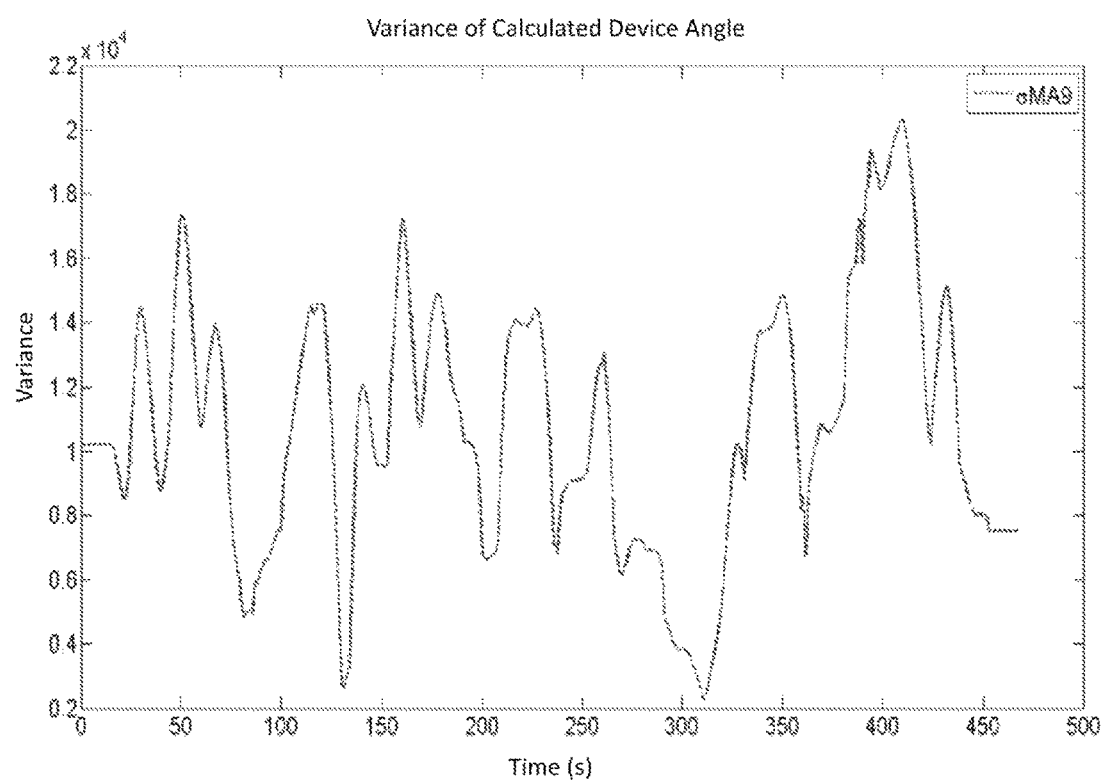
FIG. 5 is a graph showing variance in calculated device angle corresponding to a fidgeting context according to an embodiment

By comparing the variance or square root of the variance (i.e. standard deviation) of the device angle to a threshold value, ultrasonic navigation module 116 may determine if the phone is undergoing fidgeting or meaningful motion as fidgeting is associated with relatively high device angle variance and meaningful motion is associated with relatively low device angle variance. In one example, sustained regions of high variance may result in a determination of fidgeting as depicted in FIG. 5

In one aspect, oscillations in the flow signals, may be an indication of periodic motion of a user, such as walking, running, jogging, rowing, pedaling or others As an illustration, a pedestrian dead reckoning technique may be aided by analyzing the ultrasonic samples to provide an indication of the steps taken. For example and without limitation, a peak detection analysis on the variance signal may be used to estimate individual steps and summed to provide a measure of steps taken. Alternatively or in addition, the raw flow signals themselves may be computed over a specified window and assessed for variance. Further details regarding the detection of periodic motion components for use in providing a navigation solution are provided in co-pending, commonly-assigned U.S. patent application Ser. No. 14/812,949, filed Jul. 29, 2015, which is hereby incorporated by reference in its entirety.

In other embodiments, any suitable signal parameter may be analyzed for patterns to indicate the type of motion undergone by device 100 Such signals can exhibit random behavior, constant behavior, or periodic behavior. As a further example, if the Fourier transform of the flow values indicates a strong periodic component, the device can be assumed to be dangling at a constant frequency. To account for momentary anomalies due to uncontrollable environmental disturbances, the history of the classifications may be maintained to confirm the analysis. When there is correspondence with the stored history, the context classification may be treated with higher confidence In one aspect, the degree to which a determined navigational constraint is weighted when supplementing other navigational solutions or the extent to which the navigational constraint is relied upon as an independent navigational solution may depend on the confidence.

With respect to 214, ultrasonic navigation module 116 may provide a navigational constraint based on performing a Doppler analysis on samples from ultrasonic sensor 114 As noted above, range finding techniques employing ultrasonic sensor 114 utilize time of flight measurement to determine relative distance or direction information. In contrast, a Doppler analysis relies on detecting changes in wavelength of the received signal to estimate a velocity between device 100 and an external object This aspect is optional and is not necessary for all embodiments. Doppler analysis may provide a velocity for device 100, which in turn may be used to obtain relative heading changes.

With respect to 216, a misalignment angle of device 100 may be calculated from the ultrasonic flow analysis, the misalignment angle is the angle between the device frame (sensors' flame) and the platform frame, which is also the angle between the device and the direction of motion of the platform.

As noted above, in some embodiments ultrasonic flow analysis may be used to determine a relative heading changes for device 100. Alternatively or in addition, changes in velocity such as may be determined using Doppler analysis in 214 may also be used for relative heading determinations for device 100.

With respect to 218, ultrasonic navigation module 116 may also analyze the captured samples to estimate a speed of device 100, which in turn may be used as a navigational constraint. In one aspect, changes in distance and location to an external object as determined by a ultrasonic flow analysis may be used to determine speed or velocity with respect to the external object which can be used to calculate speed. Alternatively, or in addition, Doppler analysis as in 214 may be used to obtain velocity with respect to an external object. The magnitude of the velocity in the direction of motion may then be used to calculate a speed of device 100. In case of using flow analysis to determine velocity and/or speed, different techniques, including ranging by employing ultrasonic sensor 114, may be used to estimate distance to detected objects within the samples to derive a scale factor depending on the context of device 100 to transform the estimated speed or velocity from a value in term of flow to an actual speed or velocity in known units such as for example meter/second. With suitable normalization, a scalar speed in known units of portable device 100 may be determined from the samples and used as a navigational constraint Further, the speed may be resolved into a velocity vector with respect to a body frame of reference or a fixed frame of reference if desired. As will be appreciated, a speed estimate determined using samples from ultrasonic sensor 114 may be used to aid specific scenarios where traditional accelerometer-based methods may offer insufficient accuracy Examples of these scenarios include estimation of the speed when the user is on a conveyor belt, estimation of wheelchair speed, and other similar conditions.

Accordingly, the speed of a user of device 100 (or the speed of device 100 itself) may be estimated using the calculated ultrasonic flows dx and dy. Speed estimation may be refined for various use case scenarios such as dangling, texting and calling as discussed below. Absolute velocity information estimation in known frame such as North-East-Down (NED) frame or East-North-Up (ENU) frame depends on the magnitude of the user speed and direction (the user heading). The heading of the user $H_{user}$ can be calculated using Equation (15) where $\theta_{device}$ is the misalignment angle discussed before and $H_{device}$ is the device heading angle which can be calculated using gyroscopes and/or magnetometers sensors of the device.

$$H_{user}=H_{device}-\theta_{device} \quad (15)$$

Using the calculated user speed and heading, the absolute velocities in the north and east directions can be calculated using Equations (16) and (17)

$$V_N=\text{speed}_{user}*\cos(H_{user}) \quad (16)$$

$$V_E=\text{speed}_{user}*\sin(H_{user}) \quad (17)$$

Figure 6:
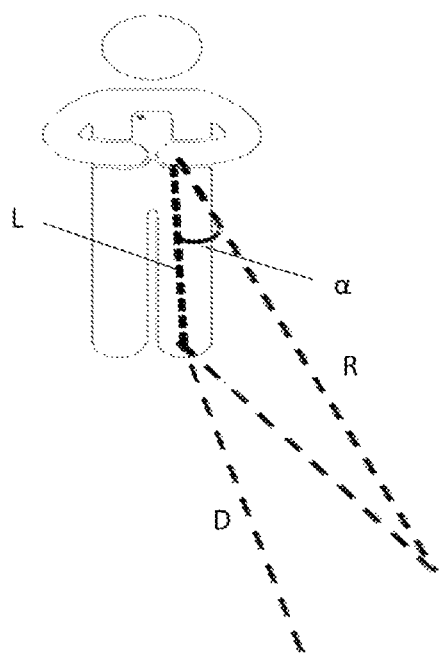
FIG. 6 is schematic diagram showing distance determination in a texting context according to an embodiment.

Speed estimation of the user may be used to find the final user velocity, and may be based on different use case scenarios (dangling, calling and texting). Thus, ultrasonic navigation module 116 may determine device 100 is in a texting mode in one embodiment, such as by using the techniques described above. It may be assumed a user will be walking inside a hall or along a corridor, or even outdoors. Although the possibility of detecting objects in the ultrasonic field of view for example a wall may be relatively small, there is a greater chance that object(s) associated with the ground will be detected in samples captured by ultrasonic sensor 114. In all cases the presented technique will work, whether detecting a wall or detecting a ground object. The speed estimation may proceed by estimating a speed in the ultrasonic flow domain that corresponds to the forward motion of the person carrying the device, and then calculating a scale factor, the scale factor is subsequently used to transform the speed in the ultrasonic flow domain to an absolute speed in the physical domain (such as for example in meters/second) The scale factor can be obtained by using the range distance R to the detected object in the field of view of the ultrasonic sensor, as depicted in FIG. 6. An alternative technique may be used to estimate the horizontal distance D between the human and the detected object where $D=R\cdot\sin(\alpha)$, where $\alpha$ is an inclination angle of device 100, which may be calculated from readings of inertial sensor 112, such as for example from pitch and roll angles that were calculated from the readings of inertial sensor 112. Another alternative technique may be used to estimate the horizontal distance D between the human and the detected object, the inclination angle $\alpha$ of device 100, and the average vertical distance L between device 100 and the ground as depicted in FIG. 6 may be used as indicated by Equation (18):

$$D = L \tan(\alpha) \quad (18)$$

Figure 7:
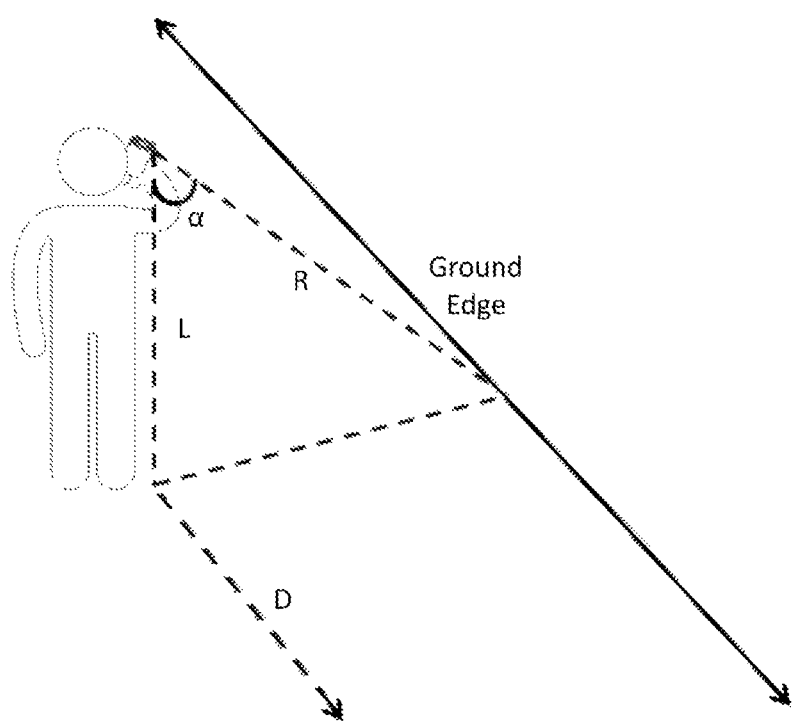
FIG. 7 is schematic diagram showing distance determination in a calling context according to an embodiment.

In one embodiment, ultrasonic navigation module 116 may determine device 100 is in an on ear mode, also by using the techniques described above In this orientation, the possibility of detecting object(s) associated with a wall and/or define a ground edge is relatively high. Again the presented technique will work, whether detecting a wall or detecting a ground object. The speed estimation may proceed by estimating a speed in the ultrasonic flow domain that corresponds to the forward motion of the person carrying the device, and then calculating a scale factor, the scale factor is subsequently used to transform the speed in the ultrasonic flow domain to an absolute speed in the physical domain (such as for example in meters/second). The scale factor can be obtained by using the range distance R to the detected object in the field of view of the ultrasonic sensor, as depicted in FIG. 7. An alternative technique may be used to estimate the horizontal distance D between the human and the detected object where D=R·sin(α), where α is an inclination angle of device 100, which may be calculated from readings of inertial sensor 112, such as for example from pitch and roll angles that were calculated from the readings of inertial sensor 112. Another alternative technique may be used to estimate the horizontal distance D between the user and the detected object using the average vertical distance L and inclination angle α of device 100 (calculated as explained above) according to Equation (18) above. If the user is in an open area without walls, distance estimation using an object on the ground may be performed as described above.

Figure 8:
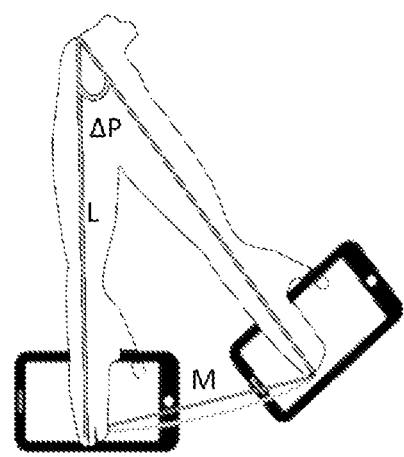
FIG. 8 is schematic diagram showing distance determination in a dangling context according to an embodiment.

In one embodiment, ultrasonic navigation module 116 may determine the user is dangling device 100. As discussed above, a dangling condition may be detected when the Fourier transform of the flow values indicates a strong periodic component The swinging motion characteristic of dangling may facilitate calculating the displacement of a featured point inside the captured field of view of ultrasonic sensor. The speed estimation may proceed by estimating a speed in the ultrasonic flow domain by removing the swinging motion (in the ultrasonic flow domain) from the forward motion of the person carrying the device (again in the ultrasonic flow domain), and then calculating a scale factor, the scale factor is subsequently used to transform the speed in the ultrasonic flow domain to an absolute speed in the physical domain (such as for example in meters/second). The scale factor can be obtained by either of two techniques. The first one is using the range distance to the detected objects in the field of view of the ultrasonic sensor. In the second technique, the swinging motion may be used to derive an appropriate scale factor between the detected motion of the device (because of one arm swing) in the captured field of view of ultrasonic sensor and the true motion of the device in the physical domain (such as in meters). As schematically depicted in FIG. 8, a range of motion of the user's arm may result in a displacement distance M of device 100. Using the average length of the human arm L and the change in pitch angle ΔP during dangling, M may be derived using Equation (19):

$$M = \sqrt{(L - L\cos(\Delta P))^2 + (L\sin(\Delta P))^2} = \sqrt{L/2(1-\cos(\Delta P))} \quad (19)$$

This method may be extended to situations when the user dangles device 100 during walking or other motion by using previous velocity information. When previous velocity information is unavailable, a suitable estimate may be determined iteratively by applying the above techniques.

As previously discussed, the translation, dx and dy, between samples $G_k$ and $G_{k-1}$ may be provided by the ultrasonic flow calculations In one embodiment, dividing the x- and y-components of the translation by the time interval between samples Δt gives the velocity in the units of flow as indicated by Equations (20) and (21), respectively:

$$vx_{rel,k} = \frac{dx_k}{\Delta t} \quad (20)$$

$$vy_{rel,k} = \frac{dy_{agg,k}}{\Delta t} \quad (21)$$

To obtain velocity in physical domain units, an appropriate scale factor c may be used to translate the velocity to the desired units (e.g. meters/second) according to Equations (22) and (23), respectively:

$$vx_k = c * vx_{relk} \quad (22)$$

$$vy_k = c * vy_{relk} \quad (23)$$

Please note that the above velocities are relative because they are in a relative flame, they can be transformed to absolute velocity by obtaining an absolute speed from them then using the misalignment and device heading to get user heading, and then absolute velocities as explained earlier in equations (15), (16), and (17).

Figure 9:
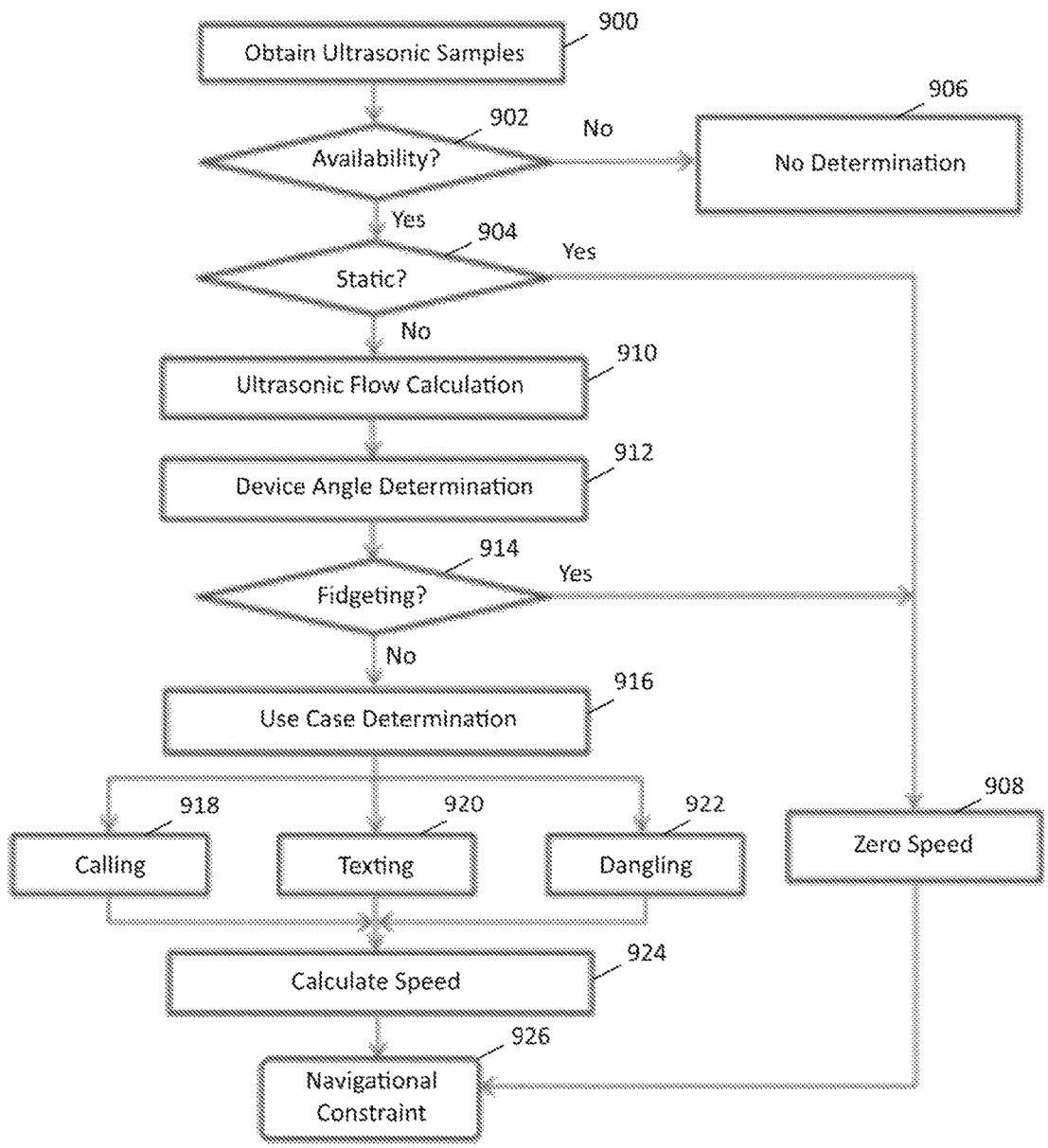
FIG. 9 is a flowchart showing a routine for providing a navigation solution for a portable device according to an embodiment

In light of the above discussion, a suitable routine for determining a navigational constraint, such as the speed of a user of device 100 by ultrasonic navigation module 116 in may involve any combination of the above techniques. To help illustrate another exemplary embodiment, FIG. 9 represents a routine that may be performed by ultrasonic navigation module 116. Beginning with 900, samples may be obtained from ultrasonic sensor 114. In 902, the availability of one or more objects as detected by ultrasonic sensor 114 may be assessed. If sufficient objects are detected, the routine continues to 904 but otherwise exits at 906. The samples may be analyzed in 904 to detect whether device 100 is in a static state. If so, the routine may branch to 908 and determine the current speed of device 100 is zero Otherwise, ultrasonic navigation module 116 may then process the samples in 910 by performing ultrasonic flow calculations as described above. In 914, variance of the determined device angles may be assessed to determine whether motion of device 100 is meaningful or whether it may be characterized as fidgeting. When a determination of fidgeting is made, the routine may branch to 908 by determining that the speed of device 100 is zero Otherwise, ultrasonic navigation module 116 may classify a use case for device 100 using any suitable technique(s), including those described above. Accordingly, in 918 the use case of device 100 may be classified as calling, in 920 the use case of device 100 may be classified as texting and in 922 the use case of device 100 may be classified as dangling. Depending on the use case classification, an appropriate calculation of device speed may be made in 924 In 926, a navigational constraint may be applied when determining a navigation solution for device 100, such as the speed calculated in 924 or a speed of zero as determined in 908

Depending on the architecture of device 100, sensor processor 108 and inertial sensor 112 may be formed on different chips, or as shown, may reside on the same chip. A sensor fusion algorithm employed to calculate the orientation of device 100 may be performed externally to sensor processor 108 and MPU 106, such as by host processor 104, or may be performed by MPU 106. A chip may be defined to include at least one substrate typically formed from a semiconductor material A single chip may be formed from multiple substrates, where the substrates are mechanically bonded to preserve the functionality. A multiple chip includes at least two substrates, wherein the two substrates are electrically connected, but do not require mechanical bonding A package provides electrical connection between the bond pads on the chip to a metal lead that can be soldered to a PCB. A package typically comprises a substrate and a cover. Integrated Circuit (IC) substrate may refer to a silicon substrate with electrical circuits, typically CMOS circuits. One or more sensors may be incorporated into the package if desired using any suitable technique. In some embodiments, a sensor may be MEMS-based, such that a MEMS cap provides mechanical support for the MEMS structure. The MEMS structural layer is attached to the MEMS cap The MEMS cap is also referred to as handle substrate or handle wafer. In some embodiments, the first substrate may be vertically stacked, attached and electrically connected to the second substrate in a single semiconductor chip, while in other embodiments, the first substrate may be disposed laterally and electrically connected to the second substrate in a single semiconductor package In one embodiment, the first substrate is attached to the second substrate through wafer bonding, as described in commonly owned U.S. Pat. No. 7,104,129, which is incorporated herein by reference in its entirety, to simultaneously provide electrical connections and hermetically seal the MEMS devices This fabrication technique advantageously enables technology that allows for the design and manufacture of high performance, multi-axis, inertial sensors in a very small and economical package Integration at the wafer-level minimizes parasitic capacitances, allowing for improved signal-to-noise relative to a discrete solution Such integration at the wafer-level also enables the incorporation of a rich feature set which minimizes the need for external amplification.

The techniques of this disclosure may be combined with any navigation solution independent of the type of the state estimation or filtering technique used in this navigation solution The state estimation technique can be linear, non-linear or a combination thereof. Different examples of techniques used in the navigation solution may rely on a Kalman filter, an Extended Kalman filter, a non-linear filter such as a particle filter, or an artificial intelligence technique such as Neural Network or Fuzzy systems The state estimation technique used in the navigation solution can use any type of system and/or measurement models. The navigation solution may follow any scheme for integrating the different sensors and systems, such as for example loosely coupled integration scheme or tightly coupled integration scheme among others. The navigation solution may utilize modeling (whether with linear or nonlinear, short memory length or long memory length) and/or automatic calibration for the errors of inertial sensors and/or the other sensors used The techniques of this disclosure may be combined with a mode of conveyance technique or a mode detection technique to establish the mode of conveyance. This enables the discrimination of different scenarios such as for example walking and driving among other possible modes

CONTEMPLATED EMBODIMENTS

The present disclosure describes the body frame to be x forward, y positive towards right side of the body and z axis positive downwards. It is contemplated that any body-frame definition can be used for the application of the method and apparatus described herein It is contemplated that the techniques of this disclosure can be used with a navigation solution that may optionally utilize automatic zero velocity periods or static period detection with its possible updates and inertial sensors bias recalculations, non-holonomic updates module, advanced modeling and/or calibration of inertial sensors errors, derivation of possible measurements updates for them from GNSS when appropriate, automatic assessment of GNSS solution quality and detecting degraded performance, automatic switching between loosely and tightly coupled integration schemes, assessment of each visible GNSS satellite when in tightly coupled mode, and finally possibly can be used with a backward smoothing module with any type of backward smoothing technique and either running in post mission or in the background on buffered data within the same mission.

It is further contemplated that techniques of this disclosure can also be used with a mode of conveyance technique or a motion mode detection technique to establish the mode of conveyance This enables the detection of pedestrian mode among other modes such as for example driving mode When pedestrian mode is detected, the method presented in this disclosure can be made operational to determine the misalignment between the device and the pedestrian.

It is further contemplated that techniques of this disclosure can also be used with a navigation solution that is further programmed to run, in the background, a routine to simulate artificial outages in the absolute navigational information and estimate the parameters of another instance of the state estimation technique used for the solution in the present navigation module to optimize the accuracy and the consistency of the solution The accuracy and consistency is assessed by comparing the temporary background solution during the simulated outages to a reference solution. The reference solution may be one of the following examples: the absolute navigational information (e g GNSS); the forward integrated navigation solution in the device integrating the available sensors with the absolute navigational information (e.g. GNSS) and possibly with the optional speed or velocity readings; or a backward smoothed integrated navigation solution integrating the available sensors with the absolute navigational information (e.g. GNSS) and possibly with the optional speed or velocity readings The background processing can run either on the same processor as the forward solution processing or on another processor that can communicate with the first processor and can read the saved data from a shared location. The outcome of the background processing solution can benefit the real-time navigation solution in its future run (i.e. real-time run after the background routine has finished running), for example, by having improved values for the parameters of the forward state estimation technique used for navigation in the present module.

It is further contemplated that the techniques of this disclosure can also be used with a navigation solution that is further integrated with maps (such as street maps, indoor maps or models, or any other environment map or model in cases of applications that have such maps or models available), and a map matching or model matching routine. Map matching or model matching can further enhance the navigation solution during the absolute navigation information (such as GNSS) degradation or interruption. In the case of model matching, a sensor or a group of sensors that acquire information about the environment can be used such as, for example, Laser range finders, cameras and vision systems, or sonar systems. These new systems can be used either as an extra help to enhance the accuracy of the navigation solution during the absolute navigation information problems (degradation or absence), or they can totally replace the absolute navigation information in some applications.

It is further contemplated that the techniques of this disclosure can also be used with a navigation solution that, when working either in a tightly coupled scheme or a hybrid loosely/tightly coupled option, need not be bound to utilize pseudorange measurements (which are calculated from the code not the carrier phase, thus they are called code-based pseudoranges) and the Doppler measurements (used to get the pseudorange rates). The carrier phase measurement of the GNSS receiver can be used as well, for example: (i) as an alternate way to calculate ranges instead of the code-based pseudoranges, or (ii) to enhance the range calculation by incorporating information from both code-based pseudorange and carrier-phase measurements; such enhancement is the carrier-smoothed pseudorange.

It is further contemplated that the techniques of this disclosure can also be used with a navigation solution that relies on an ultra-tight integration scheme between GNSS receiver and the other sensors' readings.

It is further contemplated that the techniques of this disclosure can also be used with a navigation solution that uses various wireless communication systems that can also be used for positioning and navigation either as an additional aid (which will be more beneficial when GNSS is unavailable) or as a substitute for the GNSS information (e g for applications where GNSS is not applicable) Examples of these wireless communication systems used for positioning are, such as, those provided by cellular phone towers and signals, radio signals, digital television signals, WiFi, or Wimax. For example, for cellular phone based applications, an absolute coordinate from cell phone towers and the ranges between the indoor user and the towers may be utilized for positioning, whereby the range might be estimated by different methods among which calculating the time of arrival or the time difference of arrival of the closest cell phone positioning coordinates. A method known as Enhanced Observed Time Difference (E-OTD) can be used to get the known coordinates and range. The standard deviation for the range measurements may depend upon the type of oscillator used in the cell phone, and cell tower timing equipment and the transmission losses WiFi positioning can be done in a variety of ways that includes but is not limited to time of arrival, time difference of arrival, angles of arrival, received signal strength, and fingerprinting techniques, among others; all of the methods provide different level of accuracies. The wireless communication system used for positioning may use different techniques for modeling the errors in the ranging, angles, or signal strength from wireless signals, and may use different multipath mitigation techniques All the above mentioned ideas, among others, are also applicable in a similar manner for other wireless positioning techniques based on wireless communications systems.

It is further contemplated that the techniques of this disclosure can also be used with a navigation solution that utilizes aiding information from other moving devices. This aiding information can be used as additional aid (that will be more beneficial when GNSS is unavailable) or as a substitute for the GNSS information (e.g. for applications where GNSS based positioning is not applicable) One example of aiding information from other devices may be relying on wireless communication systems between different devices The underlying idea is that the devices that have better positioning or navigation solution (for example having GNSS with good availability and accuracy) can help the devices with degraded or unavailable GNSS to get an improved positioning or navigation solution. This help relies on the well-known position of the aiding device(s) and the wireless communication system for positioning the device(s) with degraded or unavailable GNSS This contemplated variant refers to the one or both circumstance(s) where: (i) the device(s) with degraded or unavailable GNSS utilize the methods described herein and get aiding from other devices and communication system, (ii) the aiding device with GNSS available and thus a good navigation solution utilize the methods described herein. The wireless communication system used for positioning may rely on different communication protocols, and it may rely on different methods, such as for example, time of arrival, time difference of arrival, angles of arrival, and received signal strength, among others The wireless communication system used for positioning may use different techniques for modeling the errors in the ranging and/or angles from wireless signals, and may use different multipath mitigation techniques The embodiments and techniques described above may be implemented in software as various interconnected functional blocks or distinct software modules. This is not necessary, however, and there may be cases where these functional blocks or modules are equivalently aggregated into a single logic device, program or operation with unclear boundaries. In any event, the functional blocks and software modules implementing the embodiments described above, or features of the interface can be implemented by themselves, or in combination with other operations in either hardware or software, either within the device entirely, or in conjunction with the device and other processor enabled devices in communication with the device, such as a server Although a few embodiments have been shown and described, it will be appreciated by those skilled in the art that various changes and modifications can be made to these embodiments without changing or departing from their scope, intent or functionality The terms and expressions used in the preceding specification have been used herein as terms of description and not of limitation, and there is no intention in the use of such terms and expressions of excluding equivalents of the features shown and described or portions thereof, it being recognized that the disclosure is defined and limited only by the claims that follow

What is claimed is:

1. A method for navigating with a device comprising:
   processing a sequence of samples from an ultrasonic sensor of the device, wherein the processing comprises performing an ultrasonic flow analysis, wherein performing the ultrasonic flow analysis comprises determining change in relative location to an external object;
   determining a navigational constraint for the device based at least in part on the processed sequence of samples, the determined navigational constraint consisting of at least one of:
   a) a device angle;
   b) a misalignment angle of the device with respect to a direction of motion;
   c) relative heading changes obtained with respect to the external object;
   d) a speed of the device, wherein processing the sequence of samples from the ultrasonic sensor further comprises determining a distance to the external object by ranging, wherein ranging is an ultrasonic ranging that measures the distance to the external object, and wherein the speed of the device is estimated based at least in part on the ultrasonic flow analysis and the determined distance to the external object; and
e) a context for the device, wherein the context is determined as consisting of at least one of:
i) being static;
ii) fidgeting motion; and
iii) device usage; and
providing a navigation solution for the device based at least in part on the determined navigational constraint.

2. The method of claim 1, wherein determining the navigational constraint comprises estimating the device angle.

3. The method of claim 1, wherein determining the navigational constraint comprises estimating the misalignment angle of the device with respect to a direction of motion.

4. The method of claim 3, wherein the device further comprises inertial sensors, wherein the method further comprises a navigation routine using inertial sensors for providing the navigational solution and wherein the navigational constraint is applied to the navigational solution provided by the inertial navigation routine.

5. The method of claim 4, further comprising processing the sequence of samples from the ultrasonic sensor using a Doppler analysis to determine a speed of the device, wherein the determined speed is applied to the navigational solution.

6. The method of claim 3, wherein processing the sequence of samples from the ultrasonic sensor further comprises determining a distance to at least one of the external object and an additional external object by ranging, wherein ranging is an ultrasonic ranging that measures the distance to the external object, and wherein the device further comprises a gyroscope, further comprising estimating the speed of the device based at least in part on the ultrasonic flow analysis and the determined distance to at least one of the external object and the additional external object, and providing the navigational solution based at least in part on the estimated speed, the estimated misalignment angle and information from the gyroscope.

7. The method of claim 3, wherein processing the sequence of samples from the ultrasonic sensor further comprises determining a distance to at least one of the external object and an additional external object by ranging, wherein ranging is an ultrasonic ranging that measures the distance to the external object, and wherein the device further comprises a magnetometer, further comprising estimating the speed of the device based at least in part on the ultrasonic flow analysis and the determined distance to at least one of the external object and the additional external object, and providing the navigational solution based at least in part on the estimated speed, the estimated misalignment angle and information from the magnetometer.

8. The method of claim 1, wherein determining the navigational constraint comprises estimating relative heading changes obtained with respect to at least one of the external object and an additional external object.

9. The method of claim 8, wherein the device further comprises inertial sensors, wherein the method further comprises a navigation routine using inertial sensors for providing the navigational solution and wherein the navigational constraint is applied to the navigational solution provided by the inertial navigation routine.

10. The method of claim 9, further comprising processing the sequence of samples from the ultrasonic sensor using a Doppler analysis to determine a speed of the device, wherein the determined speed is applied to the navigational solution.

11. The method of claim 1, further comprising processing the sequence of samples from the ultrasonic sensor using a Doppler analysis, wherein determining the navigational constraint comprises estimating relative heading changes obtained with respect to at least one of the external object and an additional external object based at least in part on the Doppler analysis.

12. The method of claim 11, wherein the device further comprises inertial sensors, wherein the method further comprises a navigation routine using inertial sensors for providing the navigational solution and wherein the navigational constraint is applied to the navigational solution provided by the inertial navigation routine.

13. The method of claim 12, further comprising processing the sequence of samples from the ultrasonic sensor using a Doppler analysis to determine a speed of the device, wherein the determined speed is applied to the navigational solution.

14. The method of claim 1, wherein processing the sequence of samples from the ultrasonic sensor further comprises determining a distance to at least one of the external object and an additional external object by ranging, wherein ranging is an ultrasonic ranging that measures the distance to the external object.

15. The method of claim 14, wherein determining the navigational constraint includes estimating the speed of the device based at least in part on the ultrasonic flow analysis and the determined distance to the external object.

16. The method of claim 15, wherein the device further comprises inertial sensors, wherein the method further comprises a navigation routine using inertial sensors for providing the navigational solution and wherein the navigational constraint is applied to the navigational solution provided by the inertial navigation routine.

17. The method of claim 15, wherein estimating the speed includes deriving a scale factor from the determined distance to the external object.

18. The method of claim 14, wherein the device further comprises a supplemental sensor, further comprising processing a sequence of samples from the supplemental sensor to perform a flow analysis.

19. The method of claim 18, further comprising determining an additional navigational constraint, wherein the additional constraint is a speed of the device, by estimating the speed of the device based at least in part on the flow analysis performed on the sequence of samples from the supplemental sensor and the determined distance to the external object from the ultrasonic sensor by ranging, wherein ranging is an ultrasonic ranging that measures the distance to the external object, wherein providing the navigational solution is based at least in part on the estimated speed from the supplemental sensor samples.

20. The method of claim 19, wherein the device further comprises inertial sensors, wherein the method further comprises a navigation routine using inertial sensors for providing the navigational solution and wherein the navigational constraint from the flow analysis performed on the sequence of samples from the supplemental sensor is applied to the navigational solution provided by the inertial navigation routine.

21. The method of claim 18, wherein the supplemental sensor comprises an optical sensor.

22. The method of claim 21, wherein performing the optical flow analysis comprises aggregating estimations of pixel translations between the sequence of samples from the supplemental sensor.

23. The method of claim 18, wherein the supplemental sensor comprises at least one of the group including: (i) an optical camera; (ii) a thermal camera; (iii) an infra-red imaging sensor.

24. The method of claim 1, wherein determining the navigational constraint comprises determining the context for the device.

25. The method of claim 24, wherein determining the navigational constraint comprises estimating the device angle.

26. The method of claim 25, wherein determining the context of the device comprises assessing variance in a plurality of estimated device angles.

27. The method of claim 25, further comprising determining the usage of the device based at least in part on the estimated device angle.

28. The method of claim 27, wherein determining the usage of the device is also based at least in part on an orientation determination using an inertial sensor.

29. The method of claim 25, further comprising determining the context for the device corresponds to being static.

30. The method of claim 25, further comprising determining the context for the device corresponds to fidgeting motion.

31. The method of claim 25, further comprising determining the context for the device corresponds to dangling motion.

32. The method of claim 31, further comprising estimating a misalignment angle of the device with respect to a direction of motion based at least in part on the dangling motion context.

33. The method of claim 24, wherein determining the context of the device comprises comparing similarity between the sequence of samples.

34. A device comprising:
an ultrasonic sensor; and
an ultrasonic navigation module implemented at least in part with a processor, wherein the ultrasonic navigation module is configured to:
process a sequence of samples from the ultrasonic sensor of the device, wherein the processing comprises performing an ultrasonic flow analysis and wherein performing the ultrasonic flow analysis comprises determining change in relative location to an external object;
determine a navigational constraint for the device based at least in part on the processed sequence of samples, the determined navigational constraint consisting of at least one of:
a) a device angle;
b) a misalignment angle of the device with respect to a direction of motion;
c) relative heading changes obtained with respect to the external object;
d) a speed of the device, wherein processing the sequence of samples from the ultrasonic sensor further comprises determining a distance to the external object by ranging, wherein ranging is an ultrasonic ranging that measures the distance to the external object, and wherein the speed of the device is estimated based at least in part on the ultrasonic flow analysis and the determined distance to the external object; and
e) a context for the device, wherein the context is determined as consisting of at least one of:
i) being static;
ii) fidgeting motion; and
iii) device usage; and
provide a navigation solution for the device based at least in part on the determined navigational constraint.

35. The device of claim 34, wherein the ultrasonic navigation module performs the ultrasonic flow analysis to estimate the device angle.

36. The device of claim 34, wherein the ultrasonic navigation module performs the ultrasonic flow analysis to estimate the misalignment angle of the device with respect to a direction of motion.

37. The device of claim 34, wherein the ultrasonic navigation module performs the ultrasonic flow analysis to estimate relative heading changes obtained with respect to the external object.

38. The device of claim 34, wherein the ultrasonic navigation module is further configured to process the sequence of samples from the ultrasonic sensor using a Doppler analysis, wherein the ultrasonic navigation module is further configured to estimate relative heading changes obtained with respect to at least one of the external object and an additional external object based at least in part on the Doppler analysis.

39. The device of claim 34, wherein the ultrasonic navigation module is further configured to process the sequence of samples from the ultrasonic sensor using a Doppler analysis to determine the speed of the device and apply the determined speed to the navigational solution.

40. The device of claim 34, further comprising inertial sensors used to provide the navigational solution, wherein the ultrasonic navigation module is configured to apply the determined navigational constraint to the navigational solution derived from the inertial sensors.

41. The device of claim 34, further comprising a supplemental sensor, wherein the ultrasonic navigation module is further configured to:
process a sequence of samples from the supplemental sensor to perform a flow analysis;
determine a distance to at least one of the external object and an additional external object by ranging, wherein ranging is an ultrasonic ranging that measures the distance to the external object; and
determine an additional navigational constraint, wherein the additional constraint is a speed of the device and is determined from the flow analysis performed on the sequence of samples from the supplemental sensor by estimating the speed of the device based at least in part on the determined distance to at least one of the external object and the additional external object from the ultrasonic sensor by ranging; wherein providing the navigational solution is based at least in part on the estimated speed from the supplemental sensor samples.

42. The device of claim 41, wherein the supplemental sensor comprises an optical sensor.

43. The device of claim 41, wherein the supplemental sensor comprises at least one of the group including: (i) an optical camera; (ii) a thermal camera; (iii) an infra-red imaging sensor.

44. The device of claim 34, further comprising a gyroscope, wherein the ultrasonic navigation module is further configured to process the sequence of samples from the ultrasonic sensor to determine a distance to at least one of the external object and an additional external object by ranging, wherein ranging is an ultrasonic ranging that measures the distance to the external object, to estimate a speed of the device based at least in part on the ultrasonic flow analysis and the determined distance to at least one of the external object and the additional external object, to estimate the misalignment angle of the device based at least in part on the ultrasonic flow analysis and to provide the navigational solution based at least in part on the estimated speed, the estimated misalignment angle and information from the gyroscope.

45. The device of claim 34, further comprising a magnetometer, wherein the ultrasonic navigation module is further configured to process the sequence of samples from the ultrasonic sensor to determine a distance to at least one of the external object and an additional external object by ranging, wherein ranging is an ultrasonic ranging that measures the distance to the external object, to estimate the speed of the device based at least in part on the ultrasonic flow analysis and the determined distance to at least one of the external object and the additional external object, to estimate the misalignment angle of the device based at least in part on the ultrasonic flow analysis and to provide the navigational solution based at least in part on the estimated speed, the estimated misalignment angle and information from the magnetometer.

46. The device of claim 34, further comprising a gyroscope, wherein the ultrasonic navigation module is further configured to process the sequence of samples from the ultrasonic sensor using a Doppler analysis to estimate the speed of the device, to estimate the misalignment angle of the device based at least in part on the ultrasonic flow analysis and to provide the navigational solution based at least in part on the estimated speed, the estimated misalignment angle and information from the gyroscope.

* * * * *